(12) United States Patent
Nanaumi

(10) Patent No.: US 10,097,724 B2
(45) Date of Patent: Oct. 9, 2018

(54) SYSTEM, CONTROL METHOD, AND RECORDING MEDIUM

(71) Applicant: CANON KABUSHIKI KAISHA, Tokyo (JP)

(72) Inventor: Yoshihito Nanaumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 15/061,855

(22) Filed: Mar. 4, 2016

(65) Prior Publication Data
US 2016/0269586 A1 Sep. 15, 2016

(30) Foreign Application Priority Data

Mar. 9, 2015 (JP) ................................. 2015-046430

(51) Int. Cl.
| | | |
|---|---|---|
| G06F 15/00 | (2006.01) | |
| H04N 1/32 | (2006.01) | |
| H04N 1/00 | (2006.01) | |
| G06K 9/00 | (2006.01) | |
| G06K 9/20 | (2006.01) | |

(52) U.S. Cl.
CPC ..... *H04N 1/32037* (2013.01); *G06K 9/00442* (2013.01); *G06K 9/2081* (2013.01); *H04N 1/0044* (2013.01); *H04N 1/324* (2013.01); *G06K 2009/00489* (2013.01); *G06K 2209/01* (2013.01)

(58) Field of Classification Search
CPC .. H04N 1/32037; H04N 1/0044; H04N 1/324; G06K 9/00442; G06K 9/2081
USPC ....................................................... 358/402
See application file for complete search history.

(56) References Cited

U.S. PATENT DOCUMENTS

2002/0062283 A1* 5/2002 Takahashi .............. G06Q 20/10 705/42

FOREIGN PATENT DOCUMENTS

| CN | 101505351 A | 8/2009 |
|---|---|---|
| CN | 103513884 A | 1/2014 |
| JP | 2009-20642 A | 1/2009 |

OTHER PUBLICATIONS

Machine translation of Japanese Patent Document No. 2009-020642, Murakami, Jan. 29, 2009.*

* cited by examiner

*Primary Examiner* — Mark R Milia
(74) *Attorney, Agent, or Firm* — Canon U.S.A., Inc. IP Division

(57) ABSTRACT

A system includes a storage unit, a generation unit, a comparison unit, a determination unit, and an execution unit. The storage unit stores coordinates of regions included in a document and identification information of the regions. The generation unit generates regions to be subjected to character recognition in a newly-received document. The comparison unit compares the generated regions coordinates and the stored regions coordinates. The determination unit determines identification information corresponding to the generated regions coordinates according to the identification information corresponding to the regions stored in the storage unit and a comparison result of the comparison unit. The execution unit specifies a script for inputting, to an application, text information obtained by the character recognition performed on the generated regions in accordance with the determined identification information and executes the specified script. The storage unit stores the generated regions coordinates and the determined identification information of the regions.

18 Claims, 35 Drawing Sheets

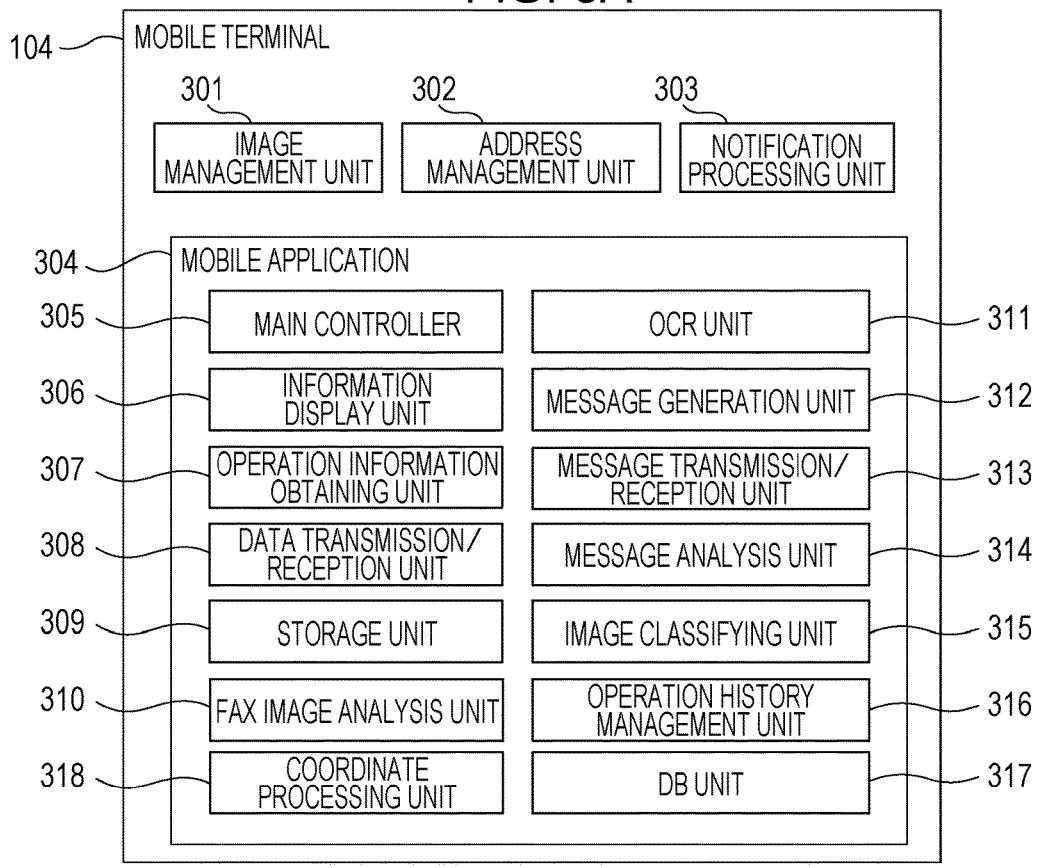
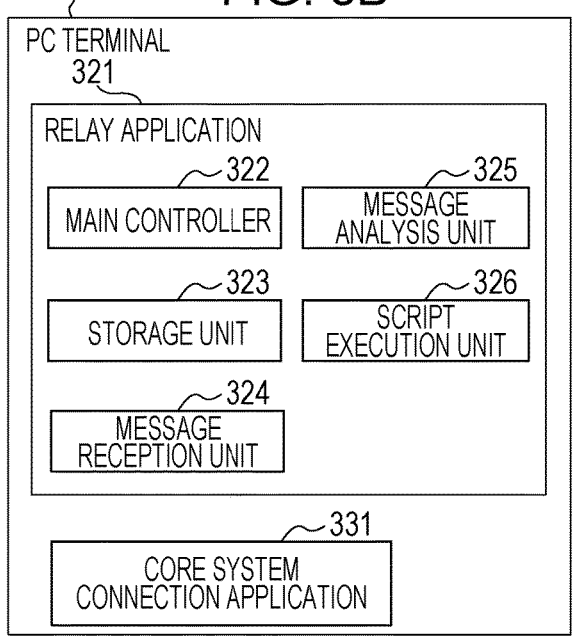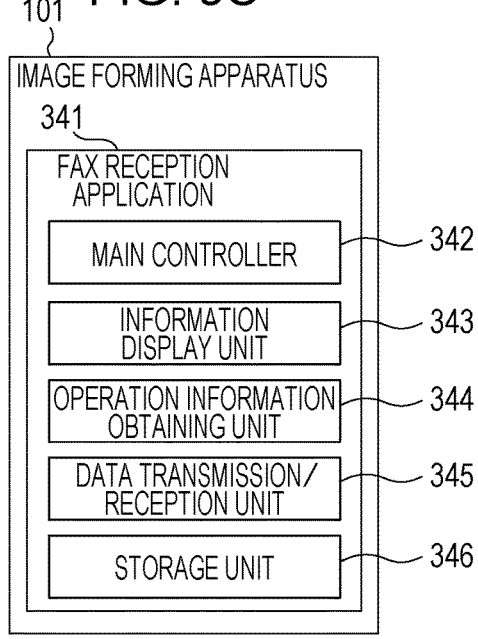

FIG. 6A

| KEY | TYPE OF VALUE | EXPLANATION |
|---|---|---|
| message | CHARACTER STRING OR DICTIONARY | MESSAGE |

602 CHILD PROPERTY OF MESSAGE

| KEY | TYPE OF VALUE | EXPLANATION |
|---|---|---|
| body | CHARACTER STRING | VALUE INPUT TO CORE SYSTEM CONNECTION APPLICATION 331 |
| internal-name | CHARACTER STRING | VALUE FOR UNIQUELY IDENTIFYING TYPE (ITEM) OF MESSAGE, OVERLAPPING IS NOT ALLOWED tel, num, code ... |
| display-name | CHARACTER STRING | VALUE USED FOR DISPLAY IN RELAY APPLICATION 321, OVERLAPPING IS ALLOWED TELEPHONE NUMBER AND PRODUCT CODE |

FIG. 6C

```
{
 "message" : {
    "internal-name" : "clear",
    "display-name" : "clear",
 }
}
```
—603

FIG. 6D

```
{
 "message" : {
    "body" : "080-1234-1234"
    "internal-name" : "tel",
    "display-name" : "telephone number",
 }
}
```
—604

FIG. 6E

```
{
 "message" : {
    "body" : "1280111"
    "internal-name" : "code",
    "display-name" : "product code",
 }
}
```
—605

FIG. 6F

```
{
 "message" : {
    "body" : "1",
    "internal-name" : "num",
    "display-name" : "product quantity",
 }
}
```
—606

FIG. 6G

```
{
 "message" : {
    "internal-name" : "create",
    "display-name" : "number issuance",
 }
}
```
—607

| CONNECTION DESTINATION ADDRESS | 192.168.0.208 |
|---|---|
| PORT NUMBER | 8100 |

| IDENTIFICATION NAME | SCRIPT FILE NAME |
|---|---|
| clear | clear.ps1 |
| tel | tel.ps1 |
| code | code.ps1 |
| num | num.ps1 |
| create | create.ps1 |

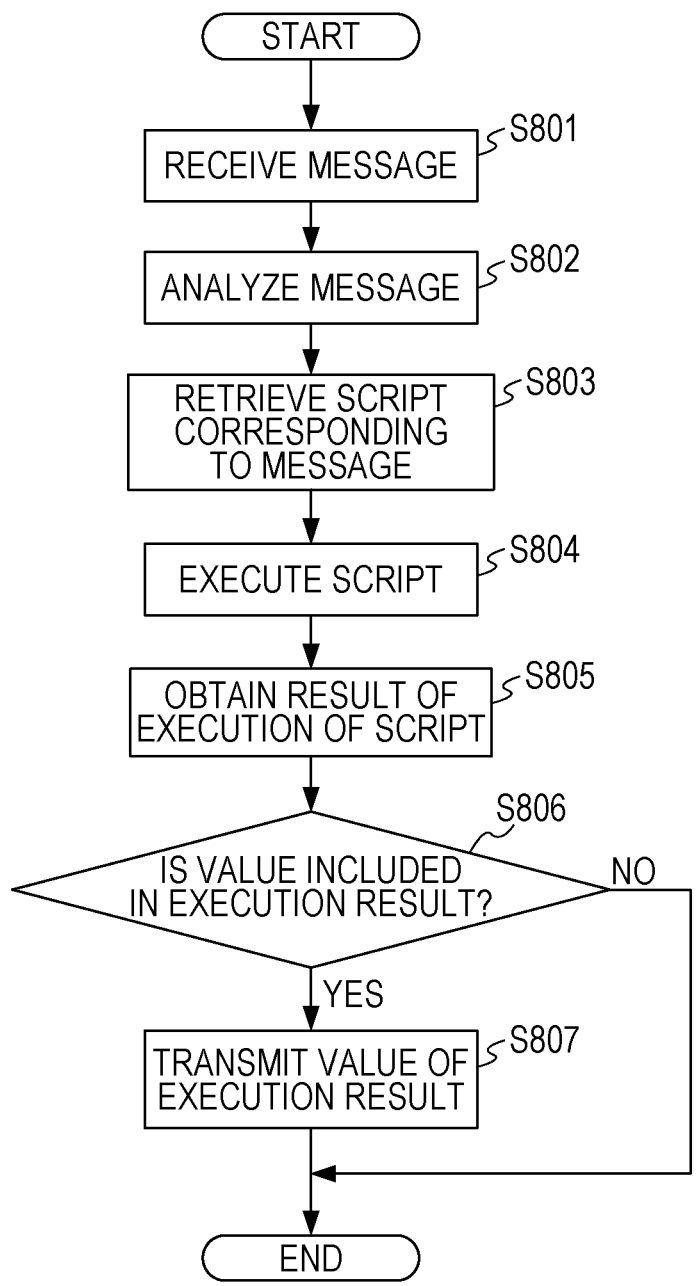

| CUSTOMER COMPANY NAME | | ~901 |
| CUSTOMER NAME | | ~902 |
| CUSTOMER DIVISION | | ~903 |
| TELEPHONE NUMBER | | SEARCH ~904 |

905

906  907  908  909  910  911

| PRODUCT CODE | PRODUCT NAME | QUANTITY | UNIT PRICE | TOTAL AMOUNT |
|---|---|---|---|---|
|  |  |  |  |  |
|  |  |  |  |  |
|  |  |  |  |  |
|  |  |  |  |  |
|  |  |  |  |  |

CLEAR    ISSUE ORDER NUMBER    ORDER NUMBER: 
912      913                    914

FIG. 12A (0, 0) — (1500, 0) X COORDINATE (px)

FAX ORDER FORM

ORDER NUMBER _____  ORDER DATE JULY 1, 2014

1201 — NAME OF ORDER COMPANY   XYZ Co., Ltd.
ADDRESS   1-111 ZZZ-CHO YYY-SHI XXX-KEN   (SIGN)
080-1234-1234

PERSON IN CHARGE   DAIJIRO SUZUKI

I WOULD LIKE TO MAKE THE FOLLOWING ORDER.

(200, 700)
1203

| MODEL NAME | PRODUCT NAME | QUANTITY | DELIVERY DATE |
|---|---|---|---|
| 2801119 | INK TANK Color CYAN | 3 | JULY 3 |
| 3801120 | INK TANK Color BLACK | 3 | JULY 3 |
| 4801121 | INK TANK Color MAGENTA | 3 | JULY 3 |
|  |  |  | MM-DD |
|  |  |  | MM-DD |
|  |  |  | MM-DD |
|  |  |  | MM-DD |
|  |  |  | MM-DD |

1202
1204
(400, 750)

— DELIVERY DESTINATION —

| COMPANY NAME OF DELIVERY DESTINATION | ABC Co., Ltd. |
|---|---|
| DIVISION NAME   GENERAL AFFAIRS DIVISION | PERSON IN CHARGE   TARO YAMADA |
| ADDRESS OF DELIVERY DESTINATION   1-111 CCC-CHO BBB-SHI AAA-KEN ||
| TELEPHONE NUMBER   222-222-2222 | FAX NUMBER   111-111-1111 |

(0, 2000) — (1500, 2000)
Y COORDINATE (px)

FIG. 12B

FAX IMAGE COORDINATE
  UPPER LEFT COORDINATE (x, y) = (200, 700)
  LOWER RIGHT COORDINATE (x, y) = (400, 750)

1205

$minX = 200/1500 * 10000 = 1333$
$minY = 700/2000 * 10000 = 3500$
$maxX = 400/1500 * 10000 = 2666$
$maxY = 800/2000 * 10000 = 4000$ DB REGISTRATION COORDINATE
  UPPER LEFT COORDINATE    (minX, minY) = (1333, 3500)
  LOWER RIGHT COORDINATE   (maxX, maxY) = (2666, 4000)

TRANSMISSION HISTORY TABLE — 1301

| Name | Type | SUMMARY |
|---|---|---|
| id | INTERGER | PRIMARY KEY |
| internalname | TEXT | TRANSMITTED TYPE INFORMATION |
| classification | TEXT | CLASSIFICATION RESULT OF FAX IMAGE |
| ocrresult | TEXT | OCR RESULT OF SELECTION REGION |
| sendmessage | TEXT | TRANSMITTED TEXT |

TRANSMISSION REGION TABLE — 1302

| Name | Type | SUMMARY |
|---|---|---|
| id | INTERGER | PRIMARY KEY, COINCIDE WITH id OF TRANSMISSION REGION TABLE |
| minX | INTERGER | UPPER LEFT X COORDINATE IN SELECTION REGION |
| maxX | INTERGER | LOWER RIGHT X COORDINATE IN SELECTION REGION |
| minY | INTERGER | UPPER LEFT Y COORDINATE IN SELECTION REGION |
| maxY | INTERGER | LOWER RIGHT Y COORDINATE IN SELECTION REGION |

CREATE TABLE send_history_data( id INTEGER PRIMARY KEY, internalname TEXT,classification TEXT,ocrresult TEXT,sendmessage TEXT)

CREATE VIRTUAL TABLE send_rect_index USING rtree('id', 'minX', 'maxX', 'minY', 'maxY')

SELECT count(id) FROM send_history_data WHERE classification = CLASSIFICATION GROUP 1

FIG. 13E

```
SELECT count(send_history_data.id) FROM send_history_data, send_rect_index
WHERE send_history_data.id = send_rect_index.id
AND send_rect_index.minX>=1333 AND send_rect_index.maxX<=3500
AND send_rect_index.minY>=2666 AND send_rect_index.maxY<=4000
AND send_history_data.classification = CLASSIFICATION GROUP 1
```
1306

FIG. 13F

```
SELECT count(DISTINCT send_history_data.internalname), send_history_data.internalName FROM
send_history_data, send_rect_index
WHERE send_history_data.id = send_rect_index.id
AND send_rect_index.minX>=1333 AND send_rect_index.maxX<=3500
AND send_rect_index.minY>=2666 AND send_rect_index.maxY<=4000
AND send_history_data.classification = CLASSIFICATION GROUP 1
```
1307

FIG. 13G

```
SELECT count(DISTINCT send_history_data.sendmessage), send_history_data.sendmessage FROM
send_history_data, send_rect_index
WHERE send_history_data.id = send_rect_index.id
AND send_rect_index.minX>=1333 AND send_rect_index.maxX<=3500
AND send_rect_index.minY>=2666 AND send_rect_index.maxY<=4000
AND send_history_data.classification = CLASSIFICATION GROUP 1
```
1308

```
SELECT count(DISTINCT send_history_data.sendmessage), send_history_data.sendmessage FROM
send_history_data, send_rect_index
WHERE send_history_data.id = send_rect_index.id
AND send_rect_index.minX<=1333 AND send_rect_index.maxX<=3500
AND send_rect_index.minY>=2666 AND send_rect_index.maxY<=4000
AND send_history_data.classification = CLASSIFICATION GROUP 1
AND send_history_data.ocrresult = '2301119'
```

```
Insert Into 'send_rect_index' Values('{0}','{1}','{2}','{3}','{4}')
Insert Into 'send_history_data' Values('{0}','{1}','{2}')
```

```
SELECT count(send_history_data.id) FROM send_history_data, send_rect_index
WHERE send_history_data.id = send_rect_index.id
AND send_rect_index.maxX<=1333 AND send_rect_index.minX<=3500
AND send_rect_index.maxY>=2666 AND send_rect_index.minY<=4000
AND send_history_data.classification = CLASSIFICATION GROUP 1
```

FIG. 16A

1600 — FAX ORDER FORM

ORDER NUMBER _____  ORDER DATE APRIL 1, 2014

NAME OF ORDER COMPANY   XYZ Co., Ltd.
ADDRESS   1-111 ZZZ-CHO YYY-SHI XXX-KEN
080-1234-1234   (SIGN)   — 1601

PERSON IN CHARGE   DAIJIRO SUZUKI

I WOULD LIKE TO MAKE THE FOLLOWING ORDER.   — 1604

| MODEL NAME | PRODUCT NAME | QUANTITY | DELIVERY DATE |
|---|---|---|---|
| 2801119 | INK TANK Color CYAN | 3 | APRIL 20 |
| 3801120 | INK TANK Color BLACK | 3 | APRIL 20 |
|  |  |  | MM-DD |
|  |  |  | MM-DD |
|  |  |  | MM-DD |
|  |  |  | MM-DD |
|  |  |  | MM-DD |
|  |  |  | MM-DD |

1602 — (row 2801119)
1603 — (row 3801120)
1605 —

DELIVERY DESTINATION

| COMPANY NAME OF DELIVERY DESTINATION | ABC Co., Ltd. |
|---|---|
| DIVISION NAME  GENERAL AFFAIRS DIVISION | PERSON IN CHARGE  TARO YAMADA |
| ADDRESS OF DELIVERY DESTINATION   1-111 CCC-CHO BBB-SHI AAA-KEN ||
| TELEPHONE NUMBER   222-222-2222 | FAX NUMBER   111-111-1111 |

FIG. 16B

TRANSMISSION HISTORY TABLE — 1606

| id | internalname | classification | ocrresult | sendmessage |
|---|---|---|---|---|
| 1 | tel | CLASSIFICATION GROUP 1 | 080-1284-1234 | 080-1234-1234 |
| 2 | code | CLASSIFICATION GROUP 1 | 2301119 | 2801119 |
| 3 | code | CLASSIFICATION GROUP 1 | 3891120 | 3891120 |
| 4 | num | CLASSIFICATION GROUP 1 | 3 | 3 |
| 5 | num | CLASSIFICATION GROUP 1 | 3 | 3 |

TRANSMISSION REGION TABLE — 1607

| id | minX | maxX | minY | maxY |
|---|---|---|---|---|
| 1 | 4500 | 7000 | 2500 | 2800 |
| 2 | 1333 | 2666 | 3500 | 3900 |
| 3 | 1335 | 2667 | 4000 | 4400 |
| 4 | 7000 | 7500 | 3450 | 3880 |
| 5 | 7020 | 7490 | 4020 | 4390 |

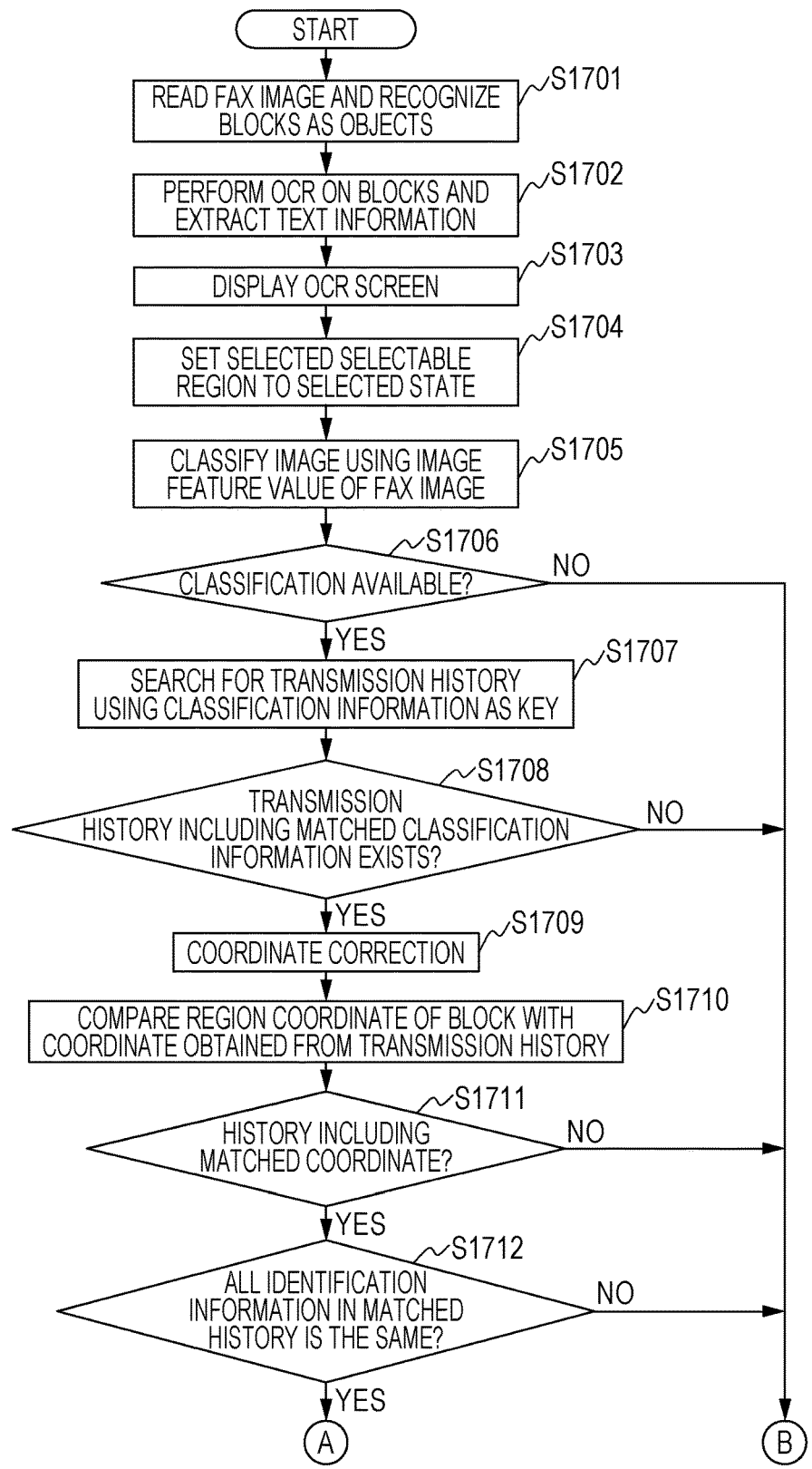

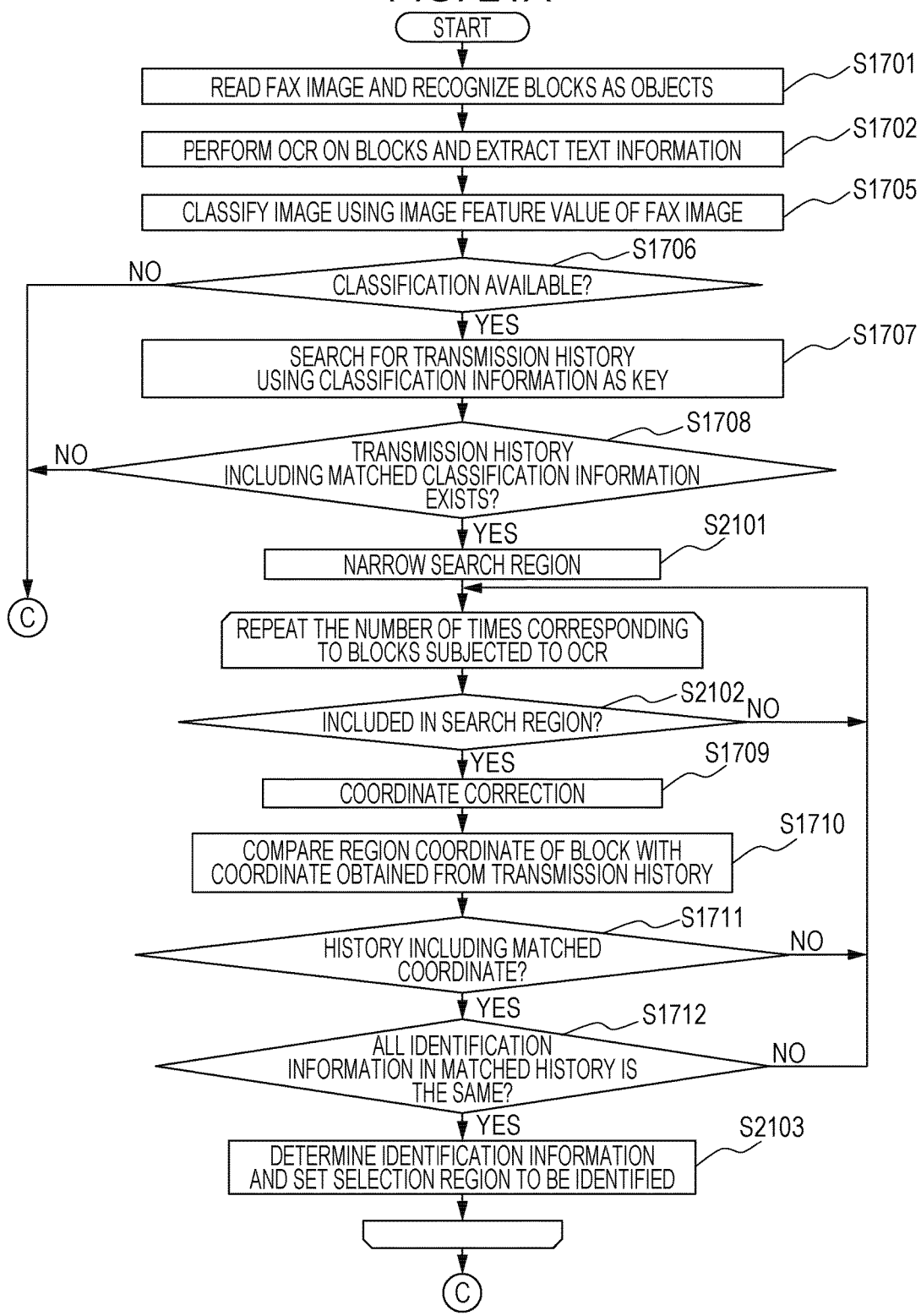

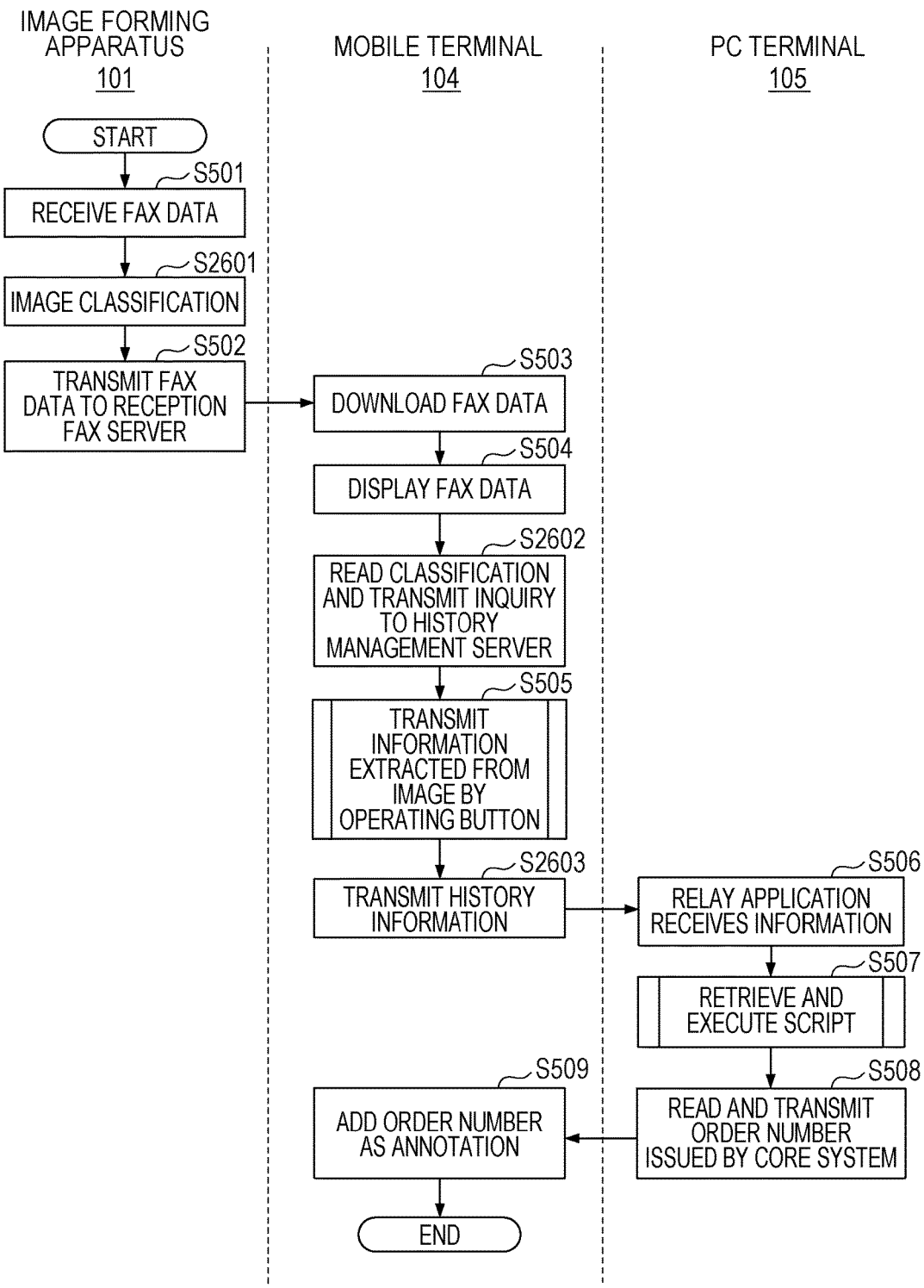

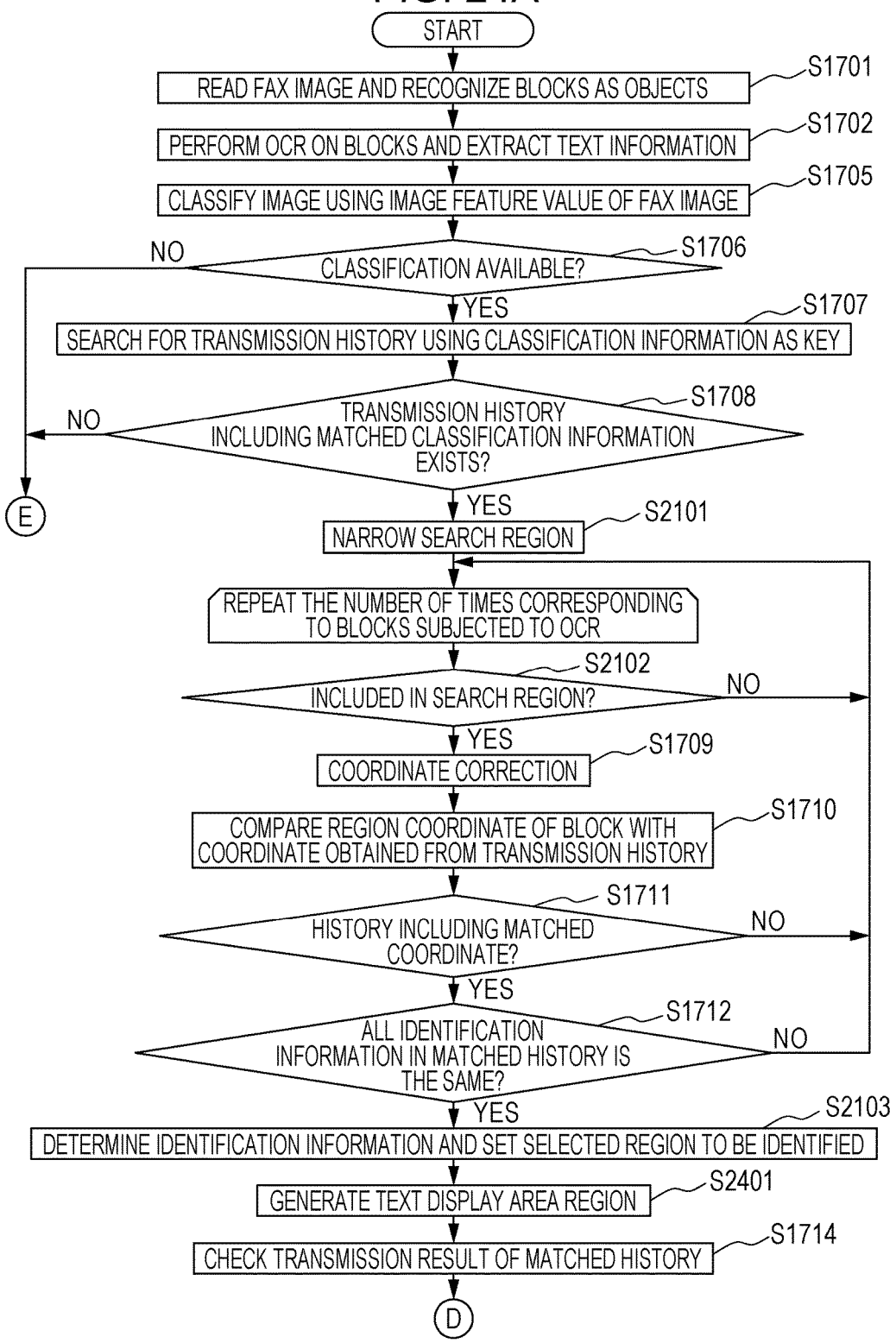

SYSTEM, CONTROL METHOD, AND RECORDING MEDIUM

BACKGROUND OF THE INVENTION

Field of the Invention

The present invention relates to a system, a control method, and a recording medium.

Description of the Related Art

In general, a system which realizes paperless faxing by obtaining received FAX data in a PC terminal as an image instead of output to a sheet, and displaying the image has been used. Japanese Patent Laid-Open No. 2009-20642 discloses a technique relating to a FAX order form paperless input system in which an order form received as FAX data is displayed in a PC terminal and information included in the FAX data is input to a system.

SUMMARY OF THE INVENTION

In this specification, as a method for inputting information included in FAX data to a system, a configuration in which text information recognized by optical character recognition (OCR) is input to an application by executing a script based on identification information is discussed. However, if a user manually specifies the identification information each time, a complicated operation is required. Therefore, a long period of time is required to input the information to the system since a long period of time is required for the operation.

However, the present invention realizes high-speed input to system by performing comparison of coordinates of regions in accordance with history of transmission results so that identification information is specified. For example, a system of the present invention generates a plurality of regions to be subjected to character recognition in a received region, compares coordinates of the generated regions with coordinates of regions in history, determines identification information corresponding to the coordinates of the generated regions in accordance with a result of the comparison and the history, and executes a script which is specified in accordance with the determined identification information and which is used to input, to an application, text information based on the character recognition performed on the generated regions.

According to an aspect of the present invention, a system includes a storage unit configured to store coordinates of regions included in a document and identification information of the regions, a generation unit configured to generate a plurality of regions to be subjected to character recognition in a newly-received document, a comparison unit configured to compare coordinates of the plurality of generated regions with the coordinates of the regions stored in the storage unit, a determination unit configured to determine identification information corresponding to the coordinates of the plurality of generated regions in accordance with the identification information corresponding to the regions stored in the storage unit and a comparison result of the comparison unit, and an execution unit configured to specify a script for inputting, to an application, text information obtained by the character recognition performed on the plurality of generated regions in accordance with the determined identification information and to execute the specified script, wherein the storage unit stores the coordinates of the plurality of generated regions and the determined identification information of the regions.

Further features of the present invention will become apparent from the following description of exemplary embodiments with reference to the attached drawings.

BRIEF DESCRIPTION OF THE DRAWINGS

FIGS. 3A to 3C are diagrams illustrating software configurations of the devices.

FIGS. 6A to 6G are diagrams illustrating data configurations of messages.

FIGS. 7A and 7B are diagrams illustrating information stored in a relay application.

FIG. 8 is a flowchart illustrating a process performed in step S507 of FIG. 5.

FIG. 9 is a diagram illustrating an operation screen of a core system connection application.

FIGS. 12A and 12B are diagrams illustrating a coordinate process.

FIGS. 13A to 13J are diagrams illustrating a data configuration of a transmission history database and SQL statements.

FIGS. 16A to 16C are diagrams illustrating information stored in the transmission history database.

FIGS. 17A and 17B are a flowchart illustrating a process performed by the mobile application.

FIGS. 21A and 21B are a flowchart illustrating a process performed by the mobile application.

FIG. 23 is a flowchart illustrating a process performed by the mobile application.

FIGS. 24A and 24B are a flowchart illustrating a process performed by the mobile application.

DESCRIPTION OF THE EMBODIMENTS

Hereinafter, embodiments of the present invention will be described with reference to the accompanying drawings. The embodiments do not limit the present invention, and it is not necessarily the case that all configurations described in the embodiments are required as means for solving problems according to the present invention.

First Embodiment
System Configuration
A FAX order system will be described as an example of an information processing system according to a first embodiment.

Figure 1:
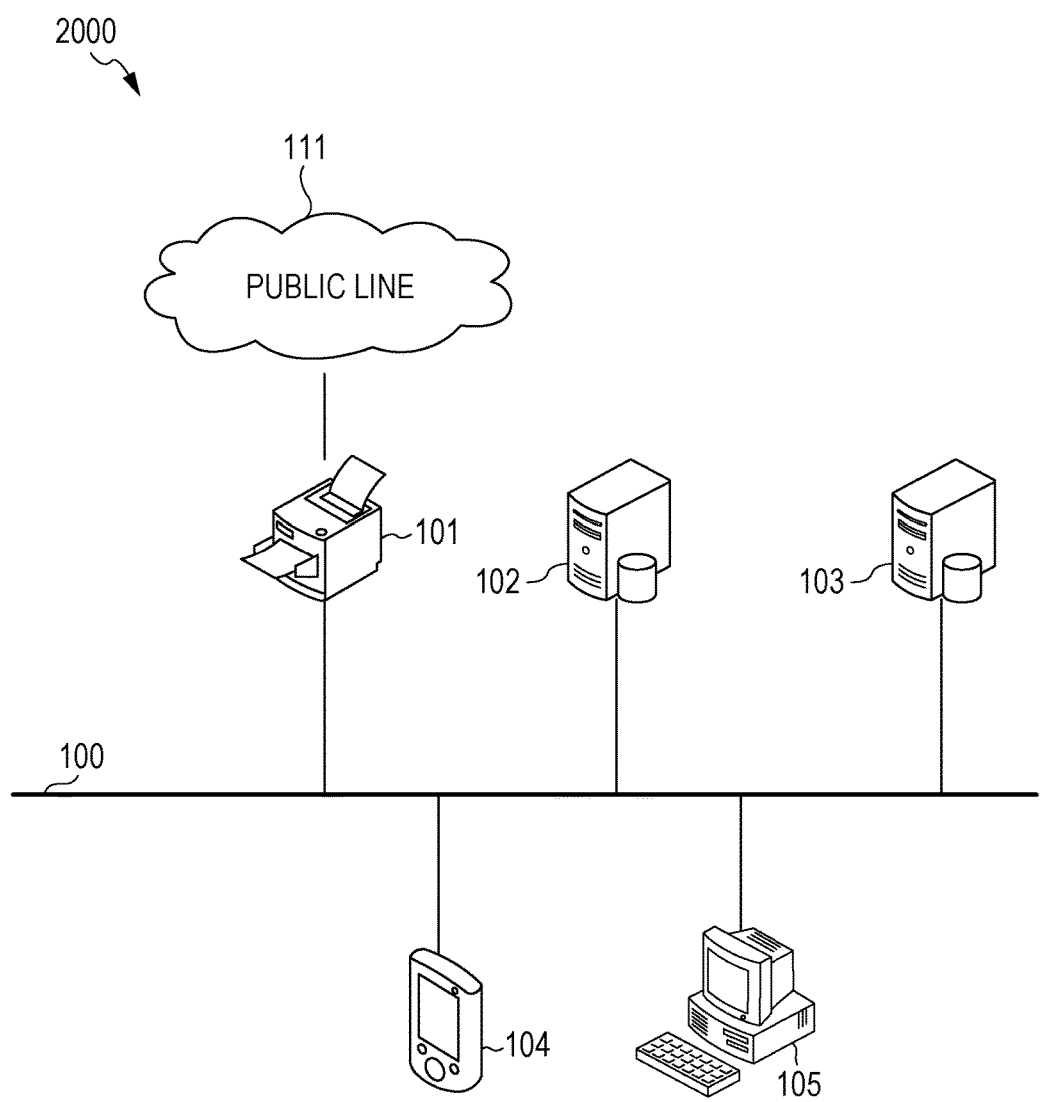
FIG. 1 is a diagram illustrating an entire configuration of a system.

FIG. 1 is a diagram illustrating an entire configuration of a FAX order system 2000. The FAX order system 2000 includes an image forming apparatus 101, a FAX storage server 102, a core corporate server 103, a mobile terminal 104 which is an example of a terminal, and a PC terminal 105.

The image forming apparatus 101 installed in a user environment is connected to a network 100 and a public line 111 for receiving FAX data. The FAX storage server 102, the core corporate server 103, the mobile terminal 104, and the PC terminal 105 which are installed in the user environment are connected to one another through the network 100 so as to communicate with one another.

Note that, although the FAX storage server 102, the core corporate server 103, the mobile terminal 104, and the PC terminal 105 belong to the same network in FIG. 1, the present invention is not limited to this. The different devices may belong to different networks or may be directly connected to the Internet. As each of the servers, a single server may be used or a plurality of servers may be used.

Examples of the FAX storage server 102 include on-premises server management block (SMB) server included in the network including the image forming apparatus 101. Alternatively, the FAX storage server 102 may be a general storage server connected to the Internet. Examples of the general storage server include OneDrive (registered trademark) of Microsoft (registered trademark) Corporation and Google drive of Google (registered trademark) Inc.

The core corporate server 103 performs a process after receiving an input of information through a core system connection application operating in the PC terminal 105 for a specific operation. In the present invention, the information received by the core corporate server 103 and the process executed based on the information are not predefined. Furthermore, an assumption that information on an input source is extracted from FAX data is not required. The core corporate server 103 simply satisfies a condition that the core corporate server 103 performs a process after receiving an input of information through the core system connection application operating in the PC terminal 105. In the system configuration illustrated in FIG. 1, a relay application included in the PC terminal 105 inputs information included in a FAX image obtained by the mobile terminal 104 to the core corporate server 103.

Figure 2:
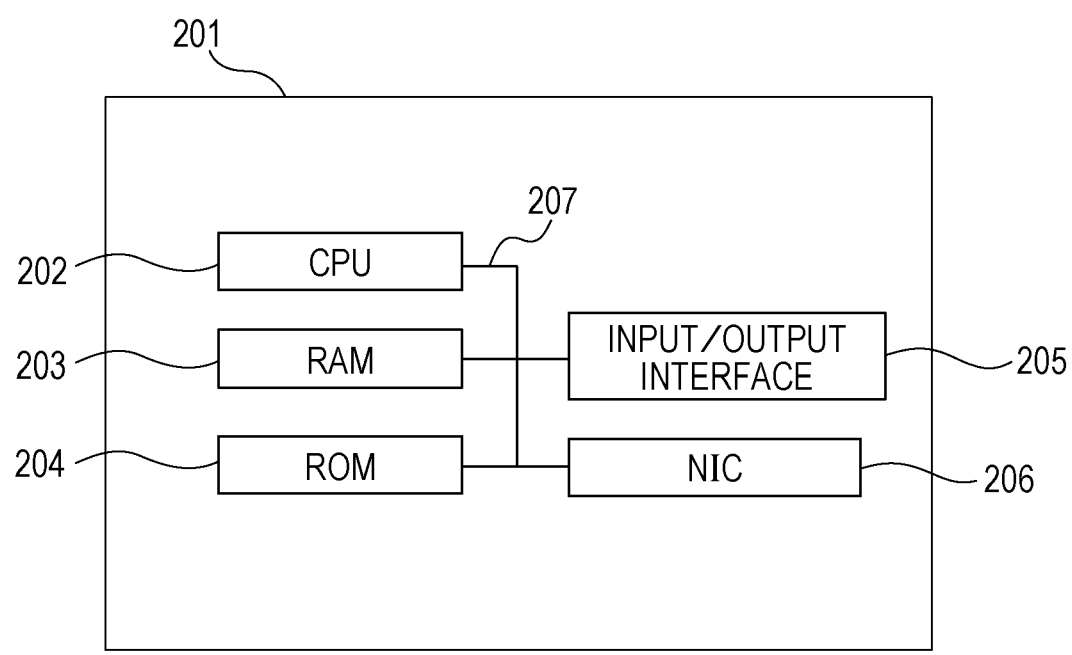
FIG. 2 is a diagram illustrating hardware configurations of devices.

Hardware Configuration
FIG. 2 is a diagram illustrating hardware configurations of the devices (the image forming apparatus 101, the FAX storage server 102, the core corporate server 103, the mobile terminal 104, and the PC terminal 105) included in the FAX order system 2000. A representative one 201 of the devices included in the FAX order system 2000 includes various units (202 to 207).

The hardware configurations of the devices included in the FAX order system 2000 may be the same as one another or different from one another.

A central processing unit (CPU) 202 executes various programs so as to realize various functions. A read only memory (ROM) 204 stores various programs and the like. A random access memory (RAM) 203 stores various types of information. The RAM 203 is also used as a temporary working storage area of the CPU 202. The CPU 202 loads a program stored in the ROM 204 to the RAM 203 and executes the program, for example.

In addition, the CPU 202 executes a process in accordance with a program stored in an external storage device, such as a flash memory, a hard disk drive (HDD), or a solid state disk (SSD). By this, the software configurations of the devices included in the FAX order system 2000 illustrated in FIG. 3 and processes in steps of sequences described below are realized.

All or some of the functions of the devices and all or some of the processes in the sequences described below may be realized by dedicated hardware.

An input/output interface 205 transmits data to a display (not illustrated) connected to the devices and receives data from a pointing device (not illustrated) similarly connected to the various devices.

A network interface card (NIC) 206 is used to connect the device to the network 100. The units described above may transmit and receive data through a bus 207.

Furthermore, the image forming apparatus 101 includes a FAX unit (not illustrated) and is capable of transmitting data to the units and receiving data from the units through the bus 207. The FAX unit may develop a FAX control language received from the devices as an image and transfer the image to another FAX apparatus (not illustrated) through the public line (not illustrated) or the Internet (IP-FAX).

The image forming apparatus 101 may further include a printing unit (not illustrated). The printing unit is capable of transmitting data to the units and receiving data from the units through the bus 207. Note that the printing unit is capable of recording (printing) a raster image on a recording medium, such as a sheet.

The image forming apparatus 101 may further include a scanner unit (not illustrated). The scanner unit is capable of transmitting data to the units and receiving data from the units through the bus 207. The scanner unit is capable of inputting an image.

Furthermore, in the mobile terminal 104, a touch panel (not illustrated) is connected to the input/output interface 205. The touch panel is an example of a display unit, such as a display, and has two functions, that is, an output (display) function and an input function.

Software Configuration (General)
Next, software configurations of the devices included in the FAX order system 2000 will be described. FIGS. 3A to 3C are diagrams illustrating software configurations of the devices.

Programs which realize functions (module sections) of software (applications) illustrated in FIGS. 3A to 3C are stored in the ROMs 204 or the like in the devices.

Software Configuration (Mobile Terminal)
Next, a software configuration of the mobile terminal 104 will be described. The mobile terminal 104 is an example of a portable terminal and may be used in various places using a wireless communication function or the like.

An operating system (OS) (not illustrated) of the mobile terminal 104 includes various modules described below (an image management unit 301, an address management unit 302, and a notification processing unit 303).

The image management unit 301 manages images and application data. The OS provides a control application programming interface (API) for using the image management unit 301. The applications obtain and store images and application data managed by the image management unit 301 using the control API.

The address management unit 302 manages address information including a name, a telephone number, and an address. As with the image management unit 301, the address management unit 302 provides a control API to be used by the applications.

The notification processing unit 303 receives notification information from a notification server (not illustrated), specifies an application which is a reception destination of a notification using a token of an application included in the notification information, and transmits the notification information to the application.

A mobile application 304 may be executed by being downloaded and installed using an installation function (such as Apple Store or Google Play) of the OS of the mobile terminal 104. The mobile application 304 performs various data processes on data managed by the FAX storage server 102.

A main controller 305 of the mobile application 304 of the mobile terminal 104 controls the mobile application 304 to issue instructions to the module units (306 to 317 described below) of the mobile application 304 and manage the module units.

An information display unit 306 provides a user interface (UI) of the mobile application 304 for the user in accordance with an instruction issued by the main controller 305.

Figure 4:
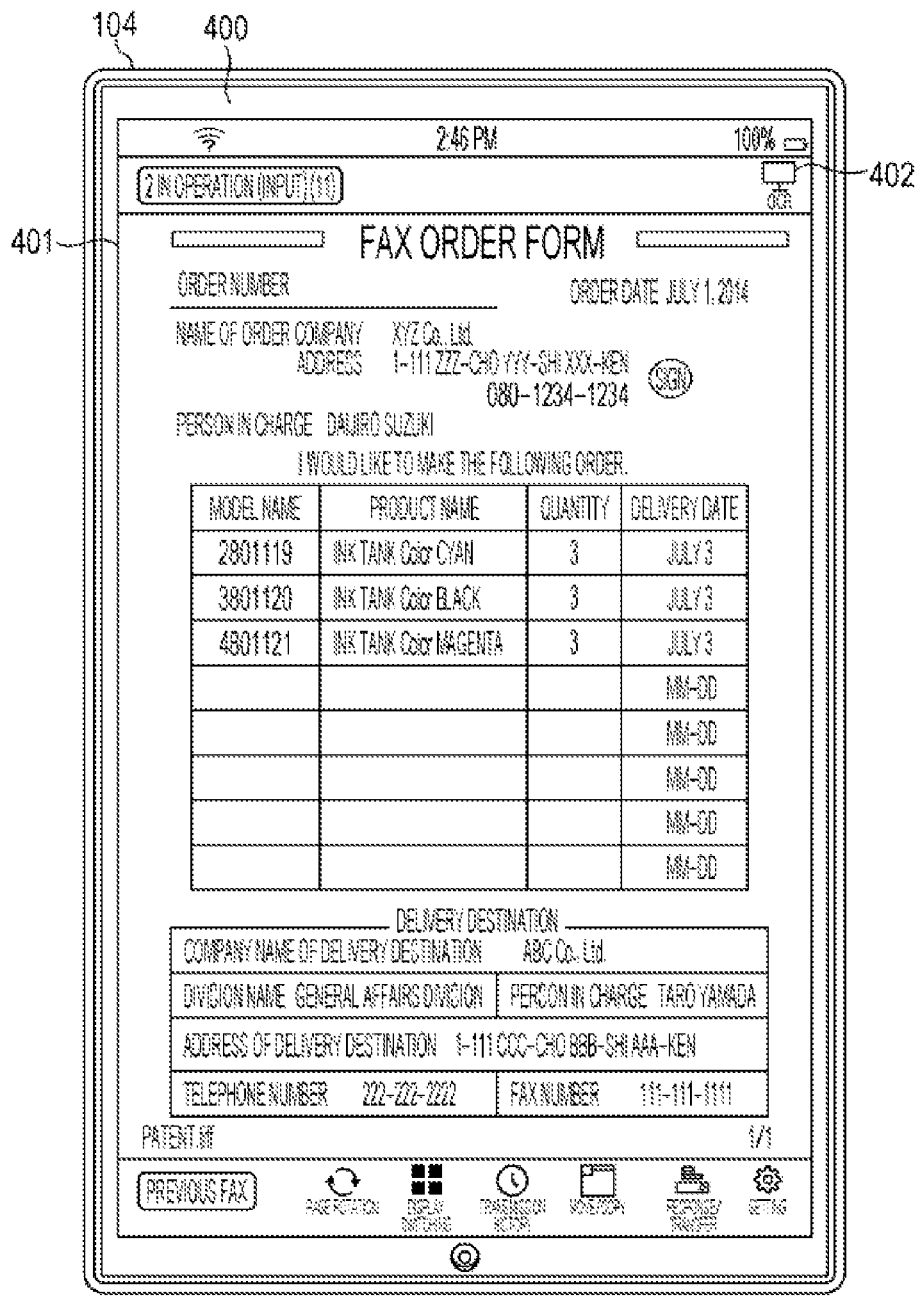
FIG. 4 is a diagram illustrating a UI of a mobile application.

FIG. 4 is a diagram illustrating a screen (a mobile terminal screen 400) for providing the UI (a UI for the portable terminal) of the mobile application 304. The mobile terminal screen 400 is displayed in the touch panel of the mobile terminal 104. Furthermore, in the mobile terminal screen 400, FAX data is displayed in an operation region 401, and an operation by a user (a user's operation) performed on a document or the like is accepted through the displayed UI. An OCR button 402 is used to change the screen to an OCR screen 1400 described below.

A form (a position, a size, a range, arrangement, display content, and the like) of the UI of the mobile application 304 is not limited to that illustrated in FIG. 4, and any configuration may be employed as long as functions of the mobile terminal 104 are realized.

Referring back to FIGS. 3A to 3C, the description of the modules of the mobile application 304 is continued.

An operation information obtaining unit 307 obtains information corresponding to an operation of the user performed on the UI of the mobile application 304 displayed by the information display unit 306 and transmits the obtained information to the main controller 305. If the user touches the display and the operation region 401, for example, the operation information obtaining unit 307 detects information on a touched position on the screen and transmits the information on the detected position to the main controller 305.

A data transmission/reception unit 308 transmits data to the FAX storage server 102 and receives data from the FAX storage server 102, and further receives the data to be transmitted from the main controller 305 and transmits the received data to the main controller 305. The data transmission/reception unit 308 requests the FAX storage server 102 to update a file by a FAX data operation and FAX data editing.

A storage unit 309 (permanently) stores a setting value input by the user through the operation information obtaining unit 307 or the UI of the mobile application 304. Furthermore, the storage unit 309 stores the data supplied from the FAX storage server 102 and received by the data transmission/reception unit 308.

A FAX image analysis unit 310 analyzes a FAX image and generates layout information. The layout information includes rectangle regions extracted from the FAX image and types of the regions (a character, a graphic, a line, a table, and the like).

An OCR unit 311 performs an OCR process on a rectangle region determined that characters are included among rectangle regions extracted by the FAX image analysis unit 310.

A message generation unit 312 generates a message to be transmitted to a relay application 321 of the PC terminal 105. The message includes text information which is a result of the process performed by the OCR unit 311 or a result of an input by the user, for example.

A message transmission/reception unit 313 transmits the message generated by the message generation unit 312 to the relay application 321 of the PC terminal 105 and receives a response message (response information) to the transmitted message. A message analysis unit 314 analyzes the response message which is supplied from the relay application 321 of the PC terminal 105 and which is received by the message transmission/reception unit 313 and executes a process on the FAX image.

An image classifying unit 315 performs a classifying process using a feature value which is subjected to a learning process in advance on the FAX image supplied from the FAX storage server 102 so as to classify the FAX image.

An operation history management unit 316 manages coordinate information of a rectangle region selected by the user, text information of an OCR result, a message transmitted to the relay application 321, and the like using a database included in a DB unit 317.

The DB unit 317 has a database function and manages operation history information.

A coordinate processing unit 318 performs a coordinate normalizing process at a time of registration of coordinate information in a database and a coordinate correction process at a time of inquiry of a coordinate to the database.

Software Configuration (PC Terminal)

Next, a software configuration of the PC terminal 105 will be described.

The PC terminal 105 is capable of executing a plurality of applications on an OS installed in the PC terminal 105. In FIGS. 3A to 3C, the relay application 321 and a core system connection application 331 are illustrated among a plurality of applications.

The core system connection application 331 is used to receive an input by the user and transmit the input to the core corporate server 103. The core system connection application 331 will be described in detail hereinafter with reference to FIG. 9.

A module configuration of the relay application 321 will now be described.

A main controller 322 controls the relay application 321 which is a relay between the mobile application 304 and the core system connection application 331 so as to issue instructions to module units (323 to 326) described below and manage the module units.

A storage unit 323 stores a script generated by the user. The script is a simple program to be executed by the relay application 321 in accordance with the message including the text information received from the mobile application 304 of the mobile terminal 104. Although not described in detail, information is input to the core corporate server 103 when the relay application 321 executes the script.

A message reception unit 324 receives a message from the mobile application 304 of the mobile terminal 104.

A message analysis unit 325 analyzes the message received by the message reception unit 324.

A script execution unit 326 executes a script which is associated with identification information included in content of the message obtained as a result of the analysis of the message performed by the message analysis unit 325 and which is stored in the storage unit 323.

Software Configuration (Image Forming Apparatus)

Next, a software configuration of the image forming apparatus 101 will be described.

The image forming apparatus 101 executes a plurality of applications on a platform of Java (registered trademark). In FIGS. 3A to 3C, a FAX reception application 341 which is one of the plurality of applications is illustrated. A module configuration of the FAX reception application 341 will now be described.

A main controller 342 controls the modules of the FAX reception application 341, issues instructions to the modules, and manages the modules.

An information display unit 343 provides a UI of the FAX reception application 341 for the user in accordance with an instruction issued by the main controller 342. The user may specify a storage destination (the FAX storage server 102) of a FAX image using the UI.

An operation information obtaining unit 344 obtains information indicating a user's operation performed on the UI of the mobile application 341 displayed by the information display unit 343 and transmits the obtained information to the main controller 342.

A data transmission/reception unit 345 transmits data to the FAX storage server 102 and receives data from the FAX storage server 102.

A storage unit 346 temporarily stores a setting value (information on assigning destinations of individual telephone numbers, for example) input by the user through the information display unit 343 and the operation information obtaining unit 344 and a FAX image to be transmitted and received.

Basic Flow

Next, a basic processing flow of the FAX order system 2000 will be described with reference to FIG. 5.

This flow is started when the FAX unit included in the image forming apparatus 101 receives a FAX image from another FAX apparatus.

In step S501, the image forming apparatus 101 receives a FAX image. Thereafter, the image forming apparatus 101 stores the received FAX image and FAX information (a header including a sender's telephone number and a FAX reception time) in the RAM 203 or the like of the image forming apparatus 101. When the FAX image is received, the main controller 342 of the FAX reception application 341 checks an address book using the sender's telephone number of the FAX information as a key and generates FAX reception bibliographic information based on information on an address corresponding to the telephone number. The storage unit 346 stores FAX reception data (the FAX image and the FAX reception bibliographic information).

In step S502, the main controller 342 transmits the FAX reception data to the FAX storage server 102 through the data transmission/reception unit 345.

In step S503, the main controller 305 of the mobile application 304 of the mobile terminal 104 downloads the FAX reception data from the FAX storage server 102.

In step S504, the information display unit 306 displays a UI in accordance with the FAX reception data.

In step S505, the FAX image analysis unit 310 analyzes the FAX image included in the FAX reception data so as to obtain layout information. The OCR unit 311 performs the OCR process on a region recognized as a character region so as to generate text information. When a user's operation, for example, an operation of instructing a transmission of the text information generated by a button operation on the UI, is performed, the message generation unit 312 generates a message to be transmitted to the relay application 321 of the PC terminal 105 and that includes the text information. The message transmission/reception unit 313 transmits the message generated by the message generation unit 312 to the relay application 321 of the PC terminal 105. The process in step S505 will be described in detail hereinafter with reference to FIGS. 17A and 17B.

In step S506, the main controller 322 of the relay application 321 of the PC terminal 105 receives the message from the mobile application 304 of the mobile terminal 104.

In step S507, the relay application 321 searches for and executes a script. The process in step S507 will be described in detail hereinafter with reference to FIG. 8.

In step S508, the main controller 322 reads an order number from the core system connection application 331 and transmits the order number to the mobile application 304 of the mobile terminal 104 as a response message.

In step S509, the main controller 305 of the mobile application 304 of the mobile terminal 104 stores the order number received from the relay application 321 of the PC terminal 105 as added information (annotation) of the FAX data.

Data Configuration

Next, the message transmitted and received between the mobile application 304 of the mobile terminal 104 and the relay application 321 of the PC terminal 105 will be described.

FIGS. 6A to 6G are diagrams illustrating a data configuration of the message of this embodiment.

A message 601 includes a message key and a value corresponding to the message key. The value of the message key includes a child property 602. The child property 602 includes a body key, an internal-name key, and a display-name key. The body key has a value (information) to be input to the core system connection application 331 when the relay application 321 of the PC terminal 105 executes a script. The internal-name key has a value for uniquely identifying a type (an item) of the message between the mobile application 304 of the mobile terminal 104 and the relay application 321 of the PC terminal 105. The display-name key has a value to be used for display by the mobile application 304 of the mobile terminal 104 and the relay application 321 of the PC terminal 105. Messages 603 to 607 are examples of content of messages represented by a Java script (registered trademark) object notation (JSON) form. The message 603 is used to clear an input to the core system connection application 331. The messages 604 to 606 are used to input a telephone number, a product code, and a product quantity, respectively, to the core system connection application 331. The message 607 is used to determine values input to the core system connection application 331 using the messages 604 to 606 and obtain an order number to be displayed in the core system connection application 331.

Information Stored in Relay Application

FIGS. 7A and 7B are diagrams illustrating information stored in the relay application 321 of the PC terminal 105. Connection destination information 711 is used to start communication with the mobile terminal 104. The connection destination information 711 includes a connection destination address and a port number which correspond to an address of the mobile terminal 104 and a listen port number of the mobile application 304, respectively. The relay application 321 uses the connection destination information 711 when the application 321 is activated and establishes communication connection to the mobile application 304 of the mobile terminal 104. Script file information 712 indicates a script file (a script) to be executed in response to a message supplied from the mobile application 304. The script file information 712 includes an identification name and a script file name. The identification name corresponds to a value of the internal-name key included in the message supplied from the mobile application 304. The connection destination information 711 and the script file information 712 are stored in the storage unit 323.

Basic Flow of Relay Application

Figure 5:
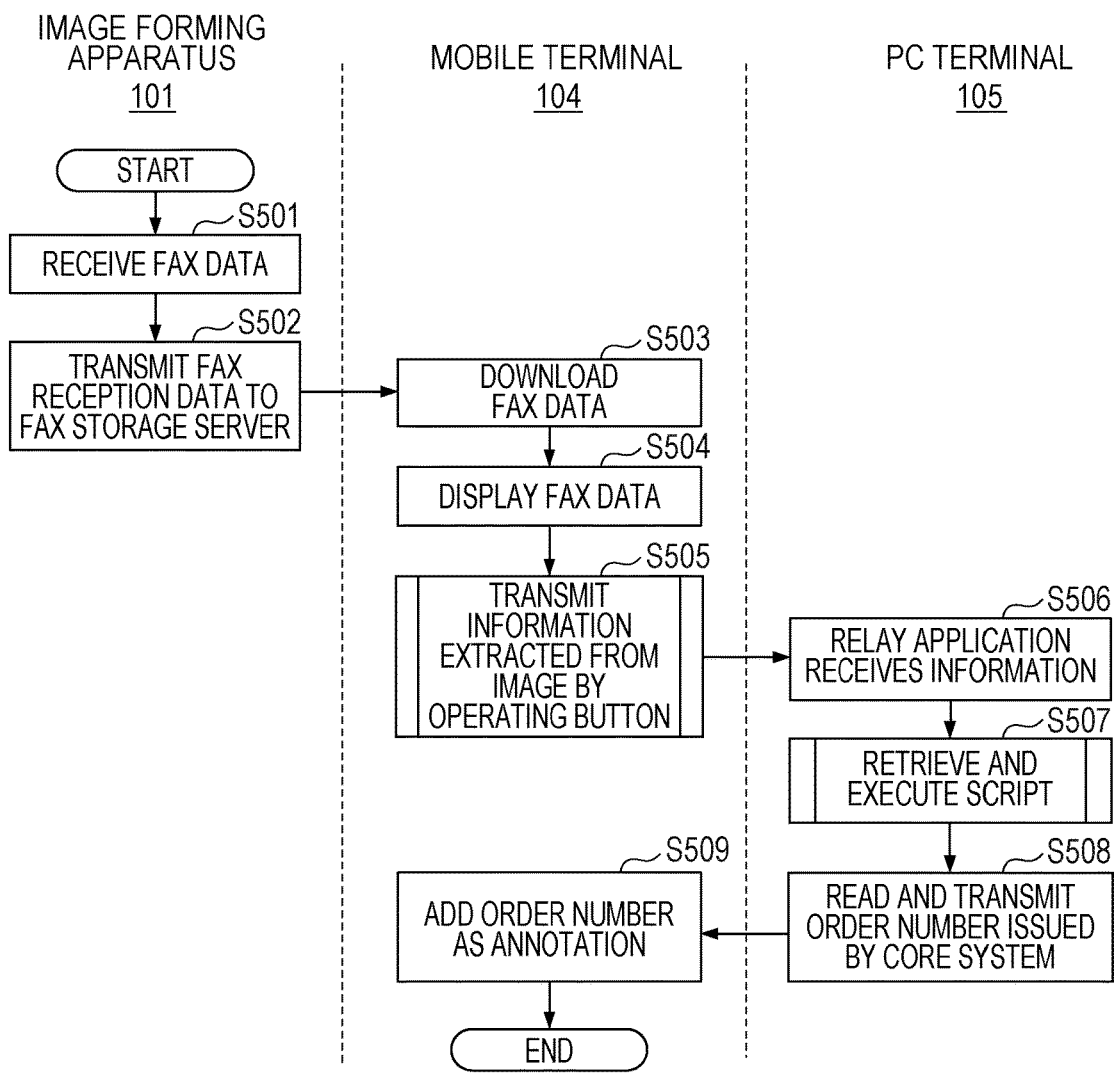
FIG. 5 is a diagram illustrating a basic processing flow of the system.

FIG. 8 is a flowchart illustrating the process performed in step S507 of FIG. 5 in detail. The relay application 321 of the PC terminal 105 receives the message from the mobile application 304 of the mobile terminal 104 in step S801. In step S802, the message analysis unit 325 analyzes the message and obtains a value of the internal-name key included in the message. In step S803, the script execution unit 326 obtains a script file name associated with the internal-name key with reference to the script file information 712. By this, a script is specified in accordance with identification information transmitted in step S1723 of FIGS. 17A and 17B described below and the specified script is executed. In step S804, the script execution unit 326 reads a script file from the storage unit 323 and executes the script. A process to be executed depends on content of the script file. In step S805, the script execution unit 326 obtains a result of the execution of the script. In step S806, the script execution unit 326 determines whether a value (response information) is included in the execution result of the script. When the determination is negative, the process is terminated. When the determination is affirmative in step S806, the main controller 322 transmits the value to the mobile application 304 in step S807.

Core System Connection Application Screen

FIG. 9 is a diagram illustrating an operation screen of the core system connection application 331.

Any application may be used as the core system connection application 331 of this embodiment as long as the application accepts user's inputs by a GUI. The core system connection application 331 of this embodiment performs the following operation on the assumption that the core system connection application 331 has a GUI illustrated in FIG. 9 for inputting information to and outputting information from the core corporate server 103.

Note that, in this embodiment, an input operation, pressing of a button, and the like to be performed by the user in a description below may be automatically performed by executing a script by the relay application 321. The process of executing a script performed by the relay application 321 will be described in detail hereinafter with reference to FIG. 10. Furthermore, the user may additionally edit information input by the relay application 321 by executing a script on the operation screen.

A reference numeral 900 denotes a main window of the core system connection application 331. Display fields 901 to 903 correspond to a customer company name display field, a customer name display field, and a customer division display field. A telephone number is input to a telephone number input field 905, and the user reads a telephone number of a sender of a FAX from the FAX image and inputs the telephone number. When a search button 904 is pressed, the database of the core corporate server 103 is searched for customer information using the telephone number input to the telephone number input field 905, and a search result is displayed (output) in the display fields 901 to 903. A reference numeral 906 denotes an order input field. The order input filed 906 has a plurality of rows (except for a title row in a first row), and each of the rows has a product code input field 907, a product name display field 908, a quantity input field 909, a unit price display field 910, and a total amount display field 911. The user reads a product code of an ordered product from the FAX image and inputs the product code in the product code input field 907. After the product code is input, the database of the core corporate server 103 is searched for product information, and a search result is displayed in the product name display field 908 and the unit price display field 910 in the same row.

Furthermore, when the user reads the number of ordered products from the FAX image and inputs the quantity in the quantity input field 909, a total amount calculated from the unit price and the quantity is displayed in the total amount display field 911 in the same row. When a plurality of products have been ordered, input to the product code input field 907 and input to the quantity input field 909 are repeatedly performed.

A reference numeral 913 denotes an order number issuance button and a reference numeral 914 denotes an order number display field. When the user presses the order number issuance button 913, the customer information displayed in the display fields 901 to 905 and the information displayed in the order input filed 906 are registered in the database of the core corporate server 103 as order information. Here, an order number issued by the core corporate server 103 is displayed in the order number display field 914. A reference numeral 912 denotes a clear button. If the user presses the clear button 912, the display in the main window 900 is initialized, that is, all the display fields are cleared.

Flow of Process Executed by Script

Figure 10:
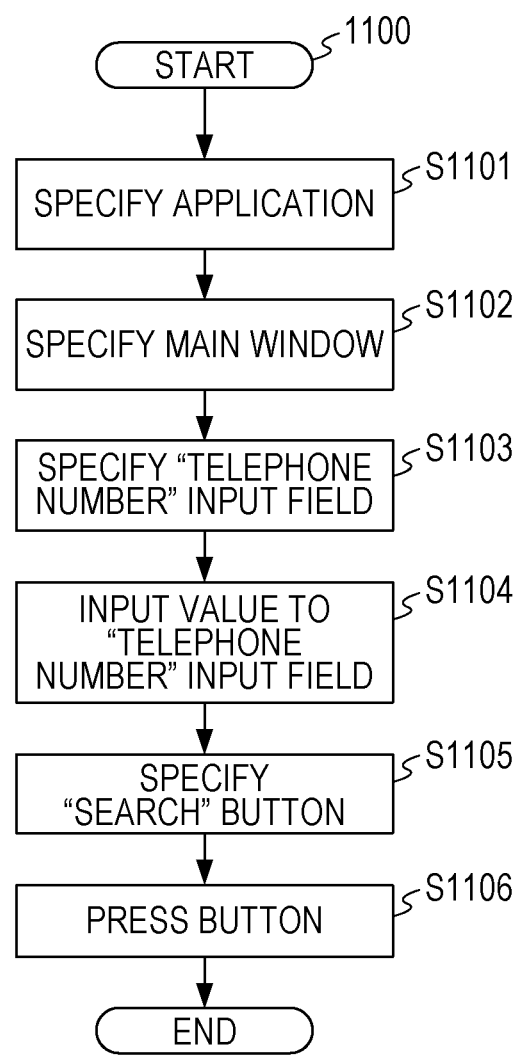
FIG. 10 is a flowchart illustrating a process of executing a script.

FIG. 10 is a flowchart illustrating a processing flow performed when a script for a telephone number is specified in step S803 and the script for the telephone number is executed in step S804 of FIG. 8 in detail. The script of this specification is generated on the assumption that the script is input to the core system connection application 331 having the GUI illustrated in FIG. 9. When the relay application 321 executes the script, a window message is transmitted and received, and information is automatically input to the core system connection application 331 without a manual input by the user. This operation will be described in detail hereinafter.

In step S803 of FIG. 8, if "tel" is set as a value of the internal-name key of the message received from the mobile application 304 of the mobile terminal 104 (see, e.g., FIG. 6D), "tel.ps1" is specified as a script. FIG. 10 is a flowchart illustrating a process that begins at step S1100 and is performed when the script tel.ps1 is executed. In step S1101, the core system connection application 331 is specified among the plurality of applications operating in the PC terminal 105. In step S1102, the main window 900 of the core system connection application 331 is specified. In step S1103, the telephone number input field 905 (an item) is specified in the GUI controls displayed in the main window 900. In step S1104, a value of the body key (see, e.g., FIG. 6D) of the message received from the mobile application 304 is set to the telephone number input field 905. In step S1105, the search button 904 is specified among the GUI controls displayed in the main window 900. In step S1106, the search button 904 is pressed.

Image Classifying Process

Figure 11A:
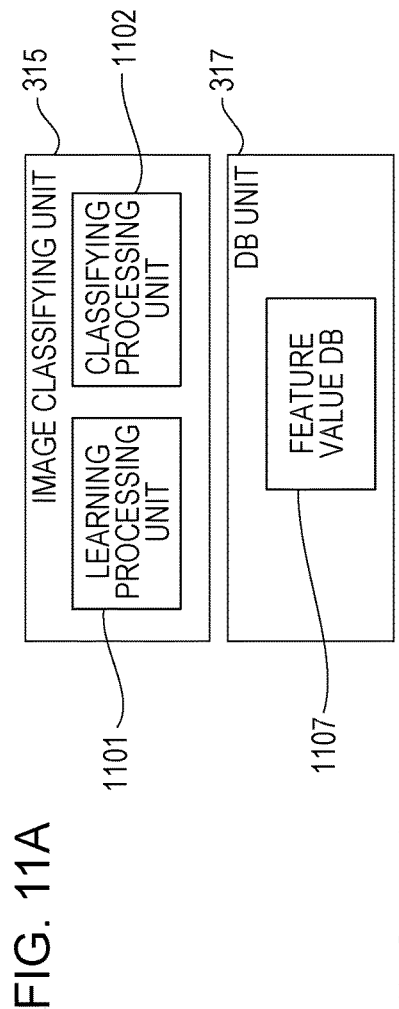
FIGS. 11A and 11B are diagrams illustrating an image classifying process.

Next, the classification of the FAX image in connection with step S1705 in FIG. 17A and performed by the image classifying unit 315 (FIG. 3A) of the mobile terminal 104 will be described with reference to FIGS. 11A and 11B. The image classifying unit 315 includes a learning processing unit 1101 and a classifying processing unit 1102. The image classifying unit 315 performs a learning process in the learning processing unit 1101 in advance and stores feature value data in a feature value DB 1107 of the DB unit 317. Furthermore, the image classifying unit 315 performs a classifying process in the classifying processing unit 1102 in accordance with information included in the feature value DB 1107 so as to determine classification.

In general, feature value data indicating a feature of an image is represented by multidimensional data and referred to as a feature vector. The number of dimensions represents the number of types of feature.

As the learning process performed by the learning processing unit 1101, feature extraction is performed on a plurality of learning images for individual classification groups and 100-dimensional feature vectors of the individual learning images are obtained. Furthermore, 10-dimensional feature vectors having remarkable features in the classification groups are determined from the 100-dimensional feature vectors. This dimension reduction process is executed by a software component referred to as a filter. The (10-dimensional) feature vectors calculated for individual classification groups and the filters are managed by the feature value DB 1107 of the DB unit 317.

As the classifying process performed in the classifying processing unit 1102, feature extraction is performed on an input FAX image 1103 and a (100-dimensional) feature vector is calculated. Filters for individual classification groups of the feature value DB 1107 are assigned to the (100-dimensional) feature vector of the input FAX image 1103 (main component analysis) so that (10-dimensional) feature vectors corresponding to the individual classification groups are calculated. Then the (10-dimensional) feature vectors of the input FAX image 1103 are compared with the (10-dimensional) feature vectors of the feature value DB 1107 so that classification is performed according to a similarity determination.

Figure 11B:
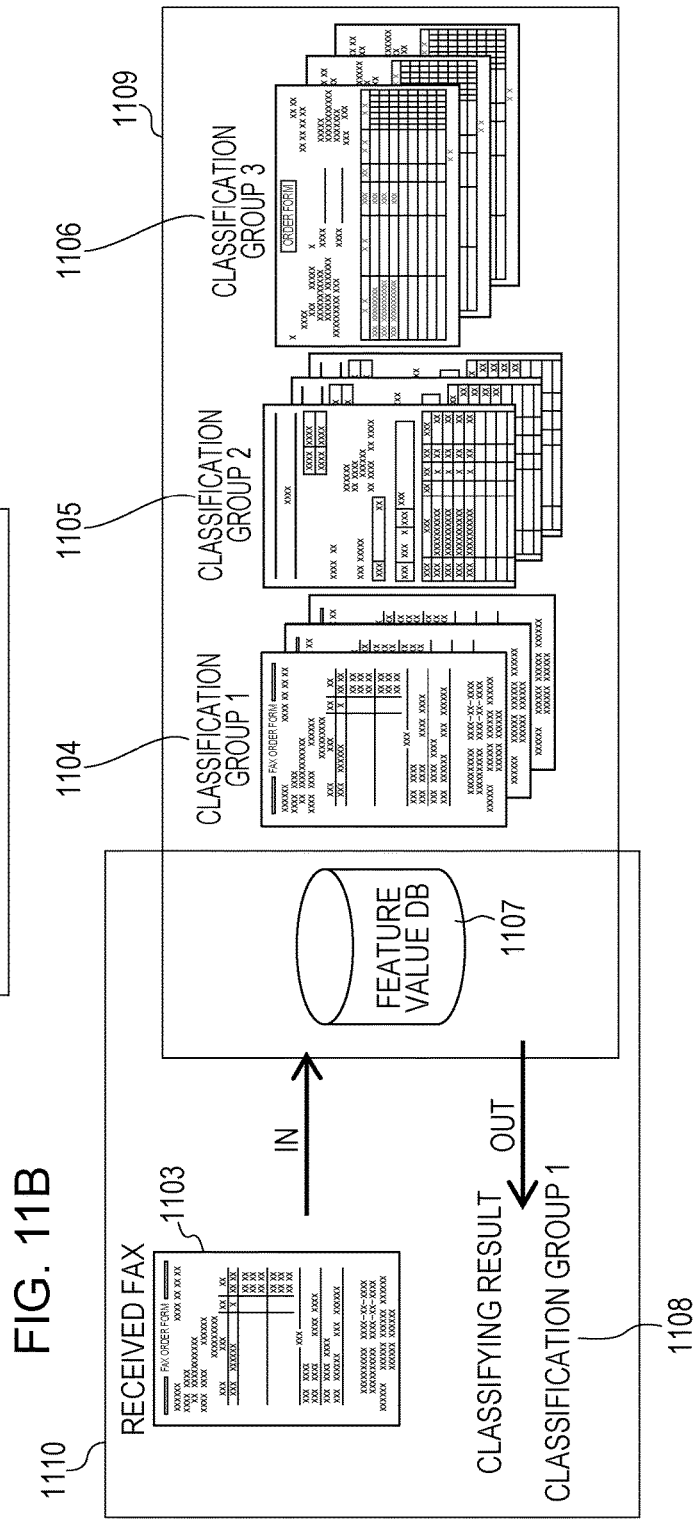

A learning result 1109 of FIG. 11B represents an example of data stored in the feature value DB 1107 in the learning process. The feature value DB 1107 stores (10-dimensional) feature vectors which may be used in classification into a classification group 1 (1104), a classification group 2 (1105), and a classification group 3 (1106) and the filters. A classification result 1110 represents an example of a result of the classification based on the input image and the information stored in the feature value DB 1107 obtained by the classifying process. The classification result 1110 represents that the input FAX image 1103 is input and a classification result 1108 of the input image is determined to be included in the classification group 1 (1104) among the classification group 1 (1104), the classification group 2 (1105), and the classification group 3 (1106). Note that the image classification performed by the image classifying unit 315 is not limited to that described in this embodiment, and any method may be employed as long as the method realizes the function described above.

Coordinate Process

Next, the coordinate normalizing process performed by the coordinate processing unit 318 will be described with reference to FIGS. 12A and 12B. The coordinate normalizing process is performed to address a case where an image does not depend on an aspect ratio of an original image and different dpi is employed. Specifically, the coordinate normalizing process is performed when information on a coordinate of a selection region which is obtained as a result of a transmission operation performed by the user is to be registered in the DB unit 317 or when inquiry of registered operation history is issued to the DB unit 317. First, examples of a coordinate system includes a display coordinate (a position in a display), a FAX image coordinate (a position in a FAX image), and a database registration coordinate. In the coordinate normalizing process, a selection coordinate selected by the user in the display is transferred to a FAX image coordinate and is further transferred to a database registration coordinate. The database registration coordinate is obtained by multiplying a rate of a FAX image coordinate to entire pixels by 10000.

Here, it is assumed that, for simplicity of description, the display coordinate and the FAX image coordinate coincide with each other, and a FAX image 1201 has pixels in a matrix of 2000 px by 1500 px. In a case where an upper left coordinate 1203 in a selection region 1202 is represented by (X, Y)=(200, 700) and a lower right coordinate 1204 is represented by (400, 750), shown in FIG. 12B as fax image coordinate 1205, the database registration coordinates are represented by (1333, 3500) and (2666, 3750) (see FIG. 12B). Hereinafter, an upper left X coordinate in the database registration coordinate is denoted by minX, a lower right X coordinate is denoted by maxX, an upper left Y coordinate is denoted by minY, and a lower right Y coordinate is denoted by maxY.

Data Configuration (DB)

Next, an operation history database 1300 included in the DB unit 317 will be described. FIGS. 13A to 13J are diagrams illustrating a data configuration of the operation history database 1300 and SQL statements of this embodiment. The operation history database 1300 includes a transmission history table 1301 and a transmission region table 1302.

The transmission history table 1301 includes an id column, an internalname column, a classification column, an ocrresult column, and a sendmessage column. The id column includes a value incremented by one every time a record is added to the transmission history table 1301 and is a primary key in the table. The internalname column stores identification information of a transmission result. The classification column stores a classification result of a FAX image (1108 of FIGS. 11A and 11B, for example). The ocrresult column stores an OCR result of a selection region. The sendmessage column stores a transmission result (transmitted text information).

The transmission region table 1302 includes an id column, a minX column, a maxX column, a minY column, and a maxY column. The minX column stores the upper left X coordinate of the selection region. The maxX column stores the lower right X coordinate of the selection region. The minY column stores the upper left Y coordinate of the selection region. The maxY column stores the lower right Y coordinate of the selection region. Furthermore, the transmission region table 1302 is configured such that high speed region search is performed on the transmission region table 1302 by an R-tree index (multidimensional information indexing) method.

SQL statements 1303 to 1310 are examples of SQL statements for various inquiries to the operation history database 1300. The SQL statement 1303 is used to newly generate the transmission history table 1301. The SQL statement 1304 is used to newly generate the transmission region table 1302. The SQL statements 1303 and 1304 are executed when the application is initialized, and the generated tables are stored in the DB unit 317. The SQL statement 1305 is used to check whether transmission history in the same classification group exists. The SQL statement 1306 is used to check whether transmission history which is in the same classification group and which has the same selection coordinate exists. The SQL statement 1307 is used to check whether matching of all identification information of the transmission history which is in the same classification group and which has the same selection coordinate is detected. The SQL statement 1308 is used to check whether matching of all transmission results of the transmission history which is in the same classification group and which corresponds to the selection coordinate is detected. The SQL statement 1309 is used to check whether transmission history which is in the same classification group and which has the same OCR result exists. The SQL statement 1310 is used to store transmission history using classification information as a key.

OCR Screen (Mobile Terminal)

Next, an OCR screen 1400 in the mobile terminal 104 will be described with reference to FIG. 14. The OCR screen 1400 is displayed when the OCR button 402 of the mobile terminal screen 400 is pressed. Blocks (regions) for the OCR are generated in the FAX image displayed in the FAX display screen (from information display unit 306) at a time of display of the OCR screen 1400 and the OCR process is performed on the blocks. Furthermore, among the blocks, blocks recognized as included text are enclosed by rectangle as selectable regions as denoted by reference numerals 1409 and 1411 so as to be displayed as a selectable state. The selectable regions 1409 and 1411 are recognized as text regions as a result of object recognition or the OCR, enclosed by rectangle, and selectable. A cancel button 1401 is used to cancel. A button display region 1402 is used to display buttons set in a button setting screen (not illustrated). When one of the selectable regions is pressed after one of buttons 1404 to 1406 is pressed, a result of the OCR in the selectable region may be transmitted to the relay application 321 as a message. The message 604 in FIG. 6D is an example of a message transmitted in a case where a telephone number button is pressed. Similarly, the message 605 in FIG. 6E and the message 606 in FIG. 6F are examples of messages transmitted in a case where the product code button 1405 and the product quantity button 1406 are pressed, respectively. An order number issuance button 1407 is used to have a number issued. A display name region 1408 is used to display names assigned to buttons. When one of the selectable regions is marked, as denoted by a reference numeral 1410, so that it is recognized that the user has selected the selectable region, the region 1410 is referred to as a selection completion region 1410. When the user selects one of the selectable regions, the region is referred to as a selection completion region and a transmission confirmation screen 1500 described below is displayed.

Transmission Confirmation Screen (Mobile Terminal)

Next, the transmission confirmation screen 1500 of the mobile terminal 104 will be described with reference to FIG. 15. In the transmission confirmation screen 1500, the user checks the OCR result of the region selected by the user, and if the user satisfies with the OCR result, the OCR result is transmitted to the relay application 321. On the other hand, if the user does not satisfy with the OCR result, correction is performed or transmission is cancelled in the transmission confirmation screen 1500. A selection completion image display region 1501 displays an image of the selectable region selected by the user in an enlarged manner. A text input area 1502 includes text information which is a result of the OCR process performed on the selected selectable region or transmission result information determined using the operation history database 1300 as an initial value which is editable. A text clear button 1503 is used to clear a text value of the text input area 1502. The text clear button 1503 is used when a wrong OCR result is obtained or the like. A transmission execution button 1504 is used to execute transmission. When the transmission execution button 1504 is pressed, a message is transmitted to the relay application 321. A cancel button 1505 is used to cancel the transmission confirmation screen 1500 so that the OCR screen 1400 is displayed again.

Example of Operation History Database

Next, an example of information stored in the operation history database 1300 will be described with reference to FIGS. 16A to 16C. In a case where the image classifying unit 315 determines a classification group of a FAX image 1600 as "classification group 1" and the user transmits selection regions 1601 to 1605 to the relay application 321, a transmission history table 1606 and a transmission region table 1607 are described as concrete examples of the transmission history table 1301 and the transmission region table 1302. A transmission history record 1608 indicates that the selection region 1601 of the FAX image 1600 is selected, identification information is "tel", and an OCR result of "080-1284-1234" is corrected to "080-1234-1234" in the transmission confirmation screen 1500 before transmission. Furthermore, a transmission history record 1609 indicates that the selection region 1602 of the FAX image 1600 is selected, identification information is "code", and an OCR result of "2301119" is corrected to "2801119" in the transmission confirmation screen 1500 before transmission. Furthermore, a transmission history record 1610 indicates that the selection region 1603 of the FAX image 1600 is selected, identification information is "code", and an OCR result of "3891120" is transmitted without correction in the transmission confirmation screen 1500. Furthermore, a transmission history record 1611 indicates that the selection region 1604 of the FAX image 1600 is selected, identification information is "num", and an OCR result of "3" is transmitted without correction in the transmission confirmation screen 1500. Furthermore, a transmission history record 1612 indicates that the selection region 1605 of the FAX image 1600 is selected, identification information is "num", and an OCR result of "3" is transmitted without correction in the transmission confirmation screen 1500.

Flowchart of Extraction Information Transmission Process

Figure 17B:
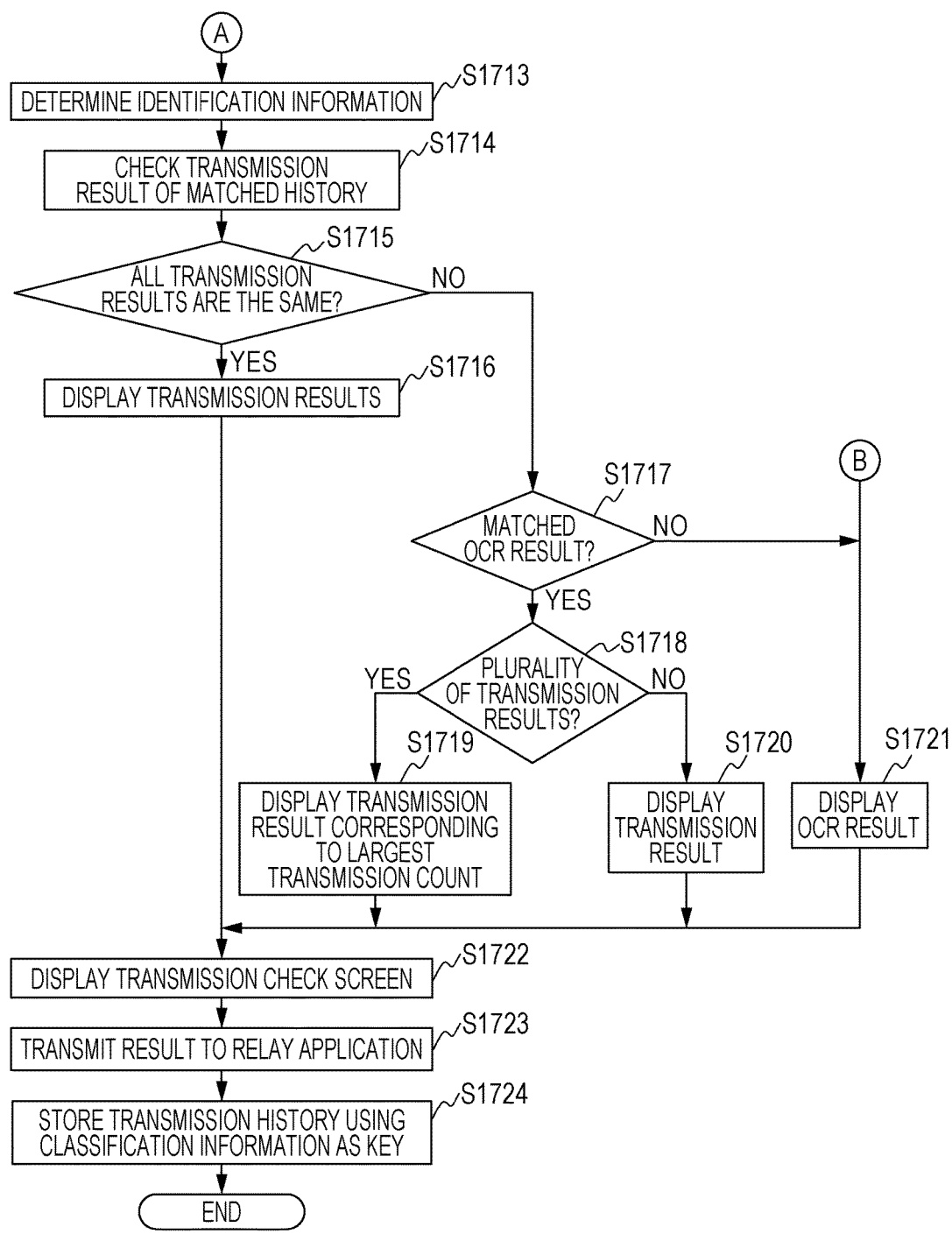
Figure 18A:
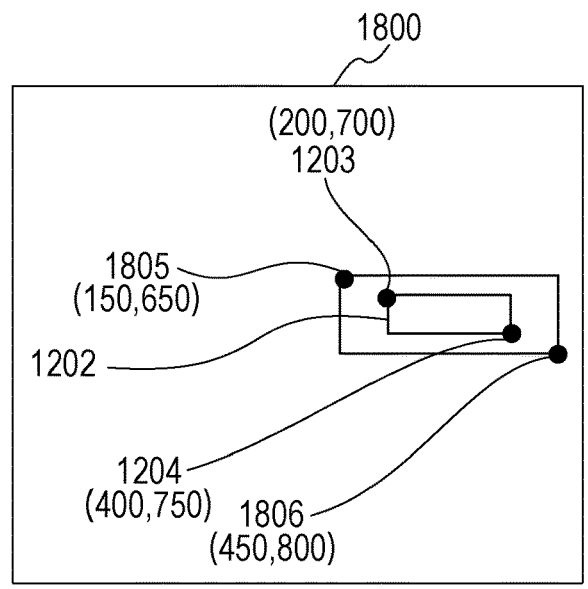
FIGS. 18A to 18E are diagrams illustrating a coordinate correction process.
Figure 18B:
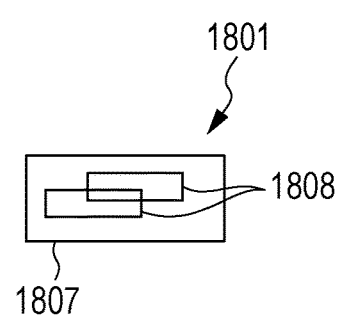
Figure 18C:
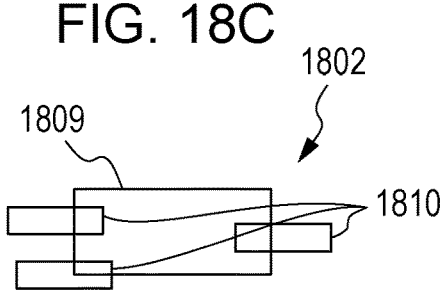
Figure 18D:
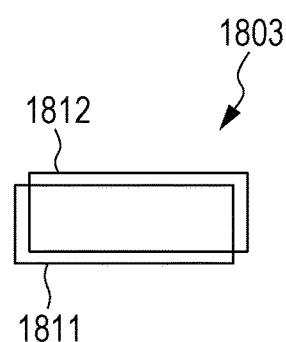
Figure 18E:
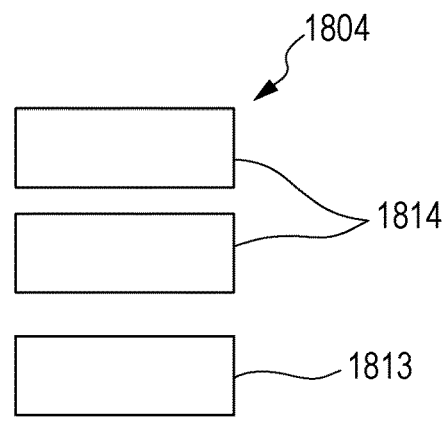

FIGS. 17A and 17B are a flowchart illustrating the process of transmitting information extracted from an image by a button operation performed in step S505 of FIG. 5 in detail. This flow is started when the user presses the OCR button 402 while a FAX image is displayed in the mobile terminal screen 400 of the mobile terminal 104.

In step S1701, the FAX image analysis unit 310 analyzes the FAX image included in FAX reception data so as to obtain a plurality of blocks for recognizing characters in the FAX image.

In step S1702, the OCR unit 311 performs the OCR process on the blocks so as to extract text information.

Figure 14:
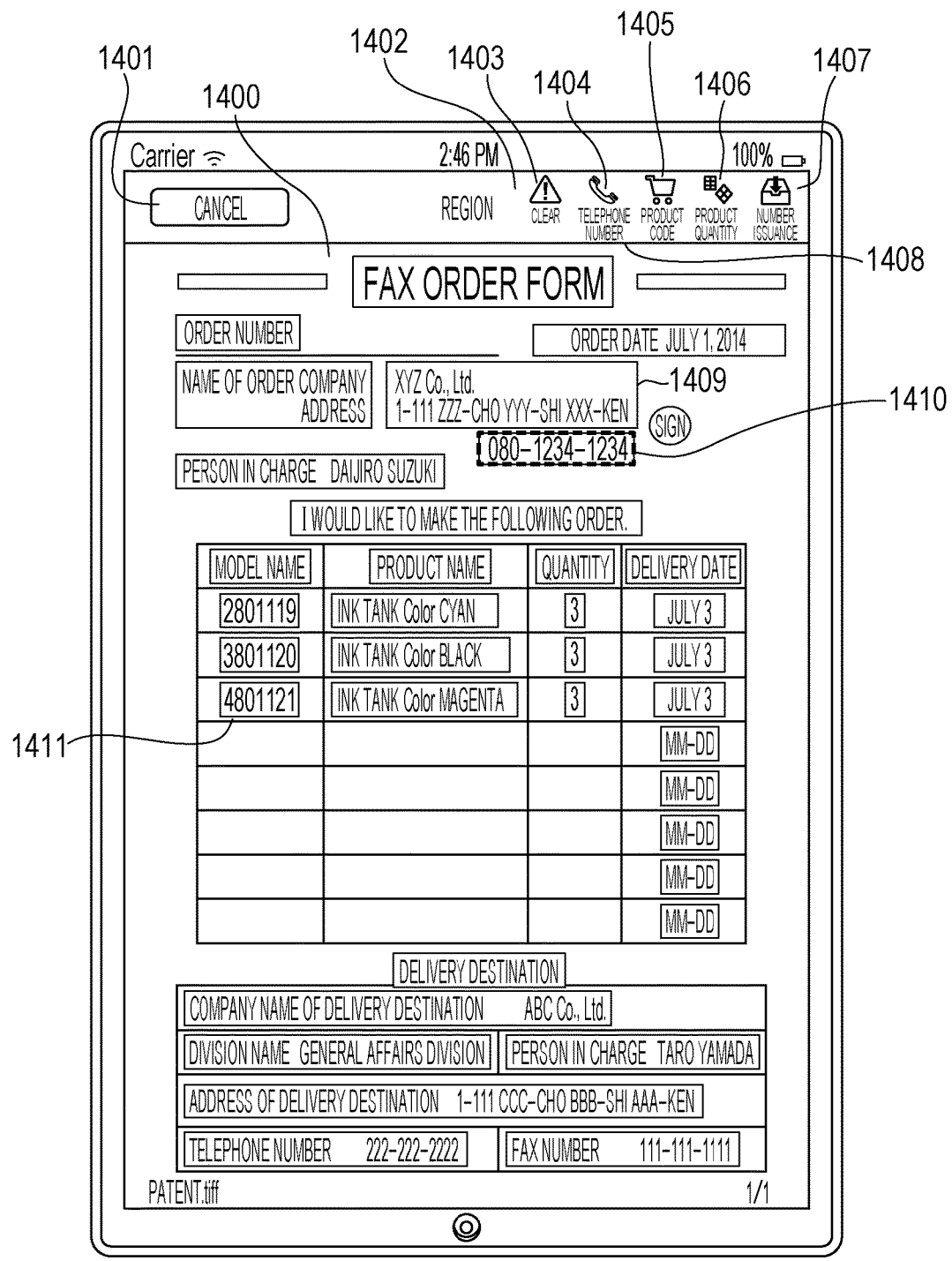
FIG. 14 is a diagram illustrating a UI of the mobile application.

In step S1703, the information display unit 306 changes color of regions of the blocks obtained by the OCR performed on the FAX image so that the blocks are brought into selectable states, and displays the OCR screen 1400 illustrated in FIG. 14.

In step S1704, when one of the selectable regions to be transmitted is selected in the OCR screen 1400 by the user, the information display unit 306 brings the selected selectable region into a selected state. In the selected state, the selection completion region is displayed so as to be distinguished from the selectable regions as illustrated in FIG. 14. For example, if the region in which "080-1234-1234" is described is selected, the region is displayed as a selection completion region 1410.

In step S1705, the classifying processing unit 1102 of the image classifying unit 315 performs the classifying process, such as previously described in connection with FIGS. 11A and 11B so as to classify the FAX image. Hereinafter, the description will be made on the assumption that the database illustrated in FIGS. 16B and 16C is generated in advance. Specifically, the transmission history table 1606 and the transmission region table 1607 are generated in advance as the operation history database 1300 (FIG. 13A) included in the feature value DB 1107 (FIG. 11B) of the DB unit 317 (FIG. 11A).

When it is determined that the FAX image has been classified in step S1706, the process proceeds to step S1707. When the FAX image has not been classified, the process proceeds to step S1721.

In step S1707, the operation history management unit 316 searches the operation history database 1300 of the DB unit 317 for history information which is in the same classification group and which has been transmitted using classification information, for example, the classification group 1 (1104), as a key. Here, a SQL statement 1305 is issued for an inquiry for the operation history database 1300.

In step S1708, when such history information is hit, the process proceeds to step S1709. When such history information is not hit, the process proceeds to step S1721. In an example of the transmission history table 1606, five records (1608 to 1612) are hit in the classification group 1 (1104), and therefore, the process proceeds to step S1709.

In step S1709, the operation history management unit 316 causes the coordinate processing unit 318 to perform the coordinate correction process and the coordinate normalizing process described with reference to FIG. 12 on coordinate information of the selection completion region 1410 selected in step S1704.

Here, the coordinate correction process, and an inclusion inquiry and an overlapping inquiry performed in step S1710 will be described with reference to FIGS. 18A to 18E. As a method for sending an inquiry to the operation history database 1300 using the coordinate information of the selection completion region 1410, two types of inquiry, that is, an inclusion inquiry 1801 and an overlapping inquiry 1802 are employed. The inclusion inquiry 1801 is issued to search an inquiry region for only a region included in the inquiry region. For example, the inclusion inquiry 1801 is issued to search an inclusion inquiry region 1807 for inclusion regions 1808. Although a speed of processing performed in response to the inclusion inquiry 1801 is high, nothing may be hit for the inquiry as denoted by a non-hit example 1803.

On the other hand, the overlapping inquiry 1802 is issued to search the inquiry region for an overlapping region. For example, the overlapping inquiry 1802 is issued to search an overlapping inquiry region 1809 for overlapping regions 1810. Although at least a region is hit with certainty when the overlapping inquiry 1802 is issued, a speed of processing performed in response to the overlapping inquiry 1802 may be low and noise may be hit.

The non-hit example 1803 is obtained when an inquiry region 1811 partially overlaps with a non-hit region 1812, that is, the inquiry region 1811 does not include the non-hit region 1812, and therefore, the non-hit region 1812 is not hit in response to the inclusion inquiry. In this way, any region is not hit when the inclusion inquiry 1801 is issued if a coordinate is slightly shifted.

Furthermore, a non-hit example 1804 is obtained when an inquiry region 1813 neither includes nor partially overlaps with non-hit regions 1814, and therefore, the regions 1814 are not hit when any one of the inclusion inquiry 1801 and the overlapping inquiry 1802 is issued. The non-hit example 1804 is obtained in a case where a FAX image including a third product code as illustrated in the OCR screen of FIG. 14 is newly read in a state in which two histories, such as the product codes 1602 and 1603 illustrated in FIG. 16A, have been stored, for example. The non-hit example 1804 represents that any region is not hit for any inquiry in a case where the selectable region 1411 is selected instead of the region 1410 in step S1704.

To address the non-hit example 1803, the coordinate correction process is performed in step S1709 so that a coordinate position is corrected. The coordinate correction process will be described in detail as a reference numeral 1800 of FIGS. 18A to 18E. In a case where the user selects the upper left coordinate 1203 and the lower right coordinate 1204 as illustrated, the upper left coordinate 1203 and the lower right coordinate 1204 are corrected to an upper left coordinate 1805 and a lower right coordinate 1806, respectively, as illustrated.

Furthermore, to address the non-hit example 1804, in a case where a region which satisfies the inclusion inquiry 1801 does not exist in step S1710, the overlapping inquiry 1802 is issued so that search is performed again.

Hereinafter, a description is made with reference to FIGS. 17A and 17B again. In step S1710, the operation history management unit 316 compares the coordinate of the selection completion region with coordinates in the operation history database 1300 in the classification group 1 (1104) of the classification information so as to determine whether one of the coordinates in the operation history database 1300 matches the coordinate of the selection completion region. Specifically, the inclusion inquiry 1801 described above is issued, and if the matching is not detected, the overlapping inquiry 1802 described above is issued. Here, the SQL statement 1306 is issued for the inclusion inquiry 1801 to be transmitted to the operation history database 1300, and an SQL statement 1311 is issued for the overlapping inquiry 1802. In the example of the transmission history table 1606, only the record 1608 is hit.

In step S1711, when the history information is hit, the process proceeds to step S1712. Otherwise, the process proceeds to step S1721.

In step S1712, when all identification information of the hit history information is the same, the process proceeds to step S1713. Otherwise, the process proceeds to step S1721. Here, the SQL statement 1307 is issued as an inquiry to the operation history database 1300. In the example of the transmission history table 1606, all the identification information is "tel", and therefore, it is determined that all the identification information is the same, and the process proceeds to step S1713.

In step S1713, identification information for the region selected in step S1704 is determined in accordance with the identification information in the transmission history table corresponding to the transmission region table, and the information display unit 306 brings a button into a selected state. In the example of the transmission history table 1606, the identification information is determined to "tel", and a telephone number button 1404 is brought into a selected state. A method for displaying the button in the selected state will be described hereinafter with reference to FIG. 15.

In step S1714, the operation history management unit 316 checks transmission results (sendmessage) of the histories hit in step S1711. Here, a SQL statement 1308 is issued for an inquiry to be transmitted to the operation history database 1300.

In step S1715, when all transmission results (sendmessage) are the same, the process proceeds to step S1716. Otherwise, the process proceeds to step S1717.

In step S1716, the operation history management unit 316 determines that the transmission results are to be displayed. In the transmission history table 1606, it is determined that "080-1234-1234" in the record 1608 is to be displayed as the transmission result.

In step S1717, the operation history management unit 316 checks whether text which matches the OCR result of the selection completion region 1410 is included in OCR results (ocrresult) of the operation history database 1300. When the matching is detected, the process proceeds to step S1718. Otherwise, the process proceeds to step S1721. Here, a SQL statement 1309 is issued for an inquiry to be transmitted to the operation history database 1300.

In step S1718, the operation history management unit 316 determines whether a plurality of transmission results have been obtained. When the determination is affirmative, the process proceeds to step S1719. When the determination is negative, the process proceeds to step S1720.

In step S1719, the operation history management unit 316 determines that one of the transmission results corresponding to a largest transmission count is to be displayed.

In step S1720, the operation history management unit 316 determines that the transmission result is to be displayed.

In step S1721, the operation history management unit 316 determines that the OCR result of the selection completion region 1410 is to be displayed.

In step S1722, the main controller 305 displays the transmission confirmation screen 1500 in accordance with the information supplied from the operation history management unit 316. An image of the selection completion image display region 1501 corresponds to an image of the selection completion region 1410. Furthermore, as a value of the text input area 1502, the transmission result or the OCR result determined in the above-described step is stored. A selected state button 1506 represents that the telephone number button 1404 is in a selected state. When identification information has not been determined in step S1713, the user is required to determine identification information and select one of the buttons 1404 to 1406.

In step S1723, when the user presses the transmission execution button 1504, the message generation unit 312 generates a message indicating that the value "080-1234-1234" in the text input area 1502 and the identification information "tel" set in the telephone number button 1404 are to be transmitted to the relay application 321. The message generated here corresponds to the message 604 of FIGS. 6A to 6G. Furthermore, the message transmission/reception unit 313 transmits the message to the relay application 321. In this way, the identification information determined in step S1713 and the text information based on the OCR performed on the blocks generated in step S1701 are transmitted.

In step S1724, the main controller 305 stores the transmission history in the operation history database 1300. Here, a SQL statement 1310 is issued for an inquiry to be transmitted to the operation history database 1300. By this, a coordinate of a region in a document and identification information corresponding to the region are stored in accordance with a transmission result of the mobile application 304.

As described above, according to this embodiment, a result of the OCR performed after a user presses the OCR button 402 displayed in the mobile terminal screen 400 and performed on the FAX image 401 obtained by the mobile terminal 104 or text information of a transmission result of history information is transmitted from the mobile terminal 104 to the relay application 321 in the PC terminal 105 along with identification information automatically determined in accordance with the history information. When the relay application 321 in the PC terminal 105 executes a script specified by the identification information received from the mobile terminal 104, an input operation is automatically performed on the system instead of a manual input by the user.

Second Embodiment

In a second embodiment, a second extraction information transmission process will be described. Detailed descriptions of the configurations and the processing flows described in the foregoing embodiment are omitted. Although identification information of a selectable region selected by the user is determined using history information and OCR information at a time of selection in the first embodiment, identification information of all selection regions are automatically determined in advance in accordance with history information at a time of display of an OCR screen 1900 described below so as to be visually displayed for the user.

OCR Screen (Mobile Terminal)

Figure 19:
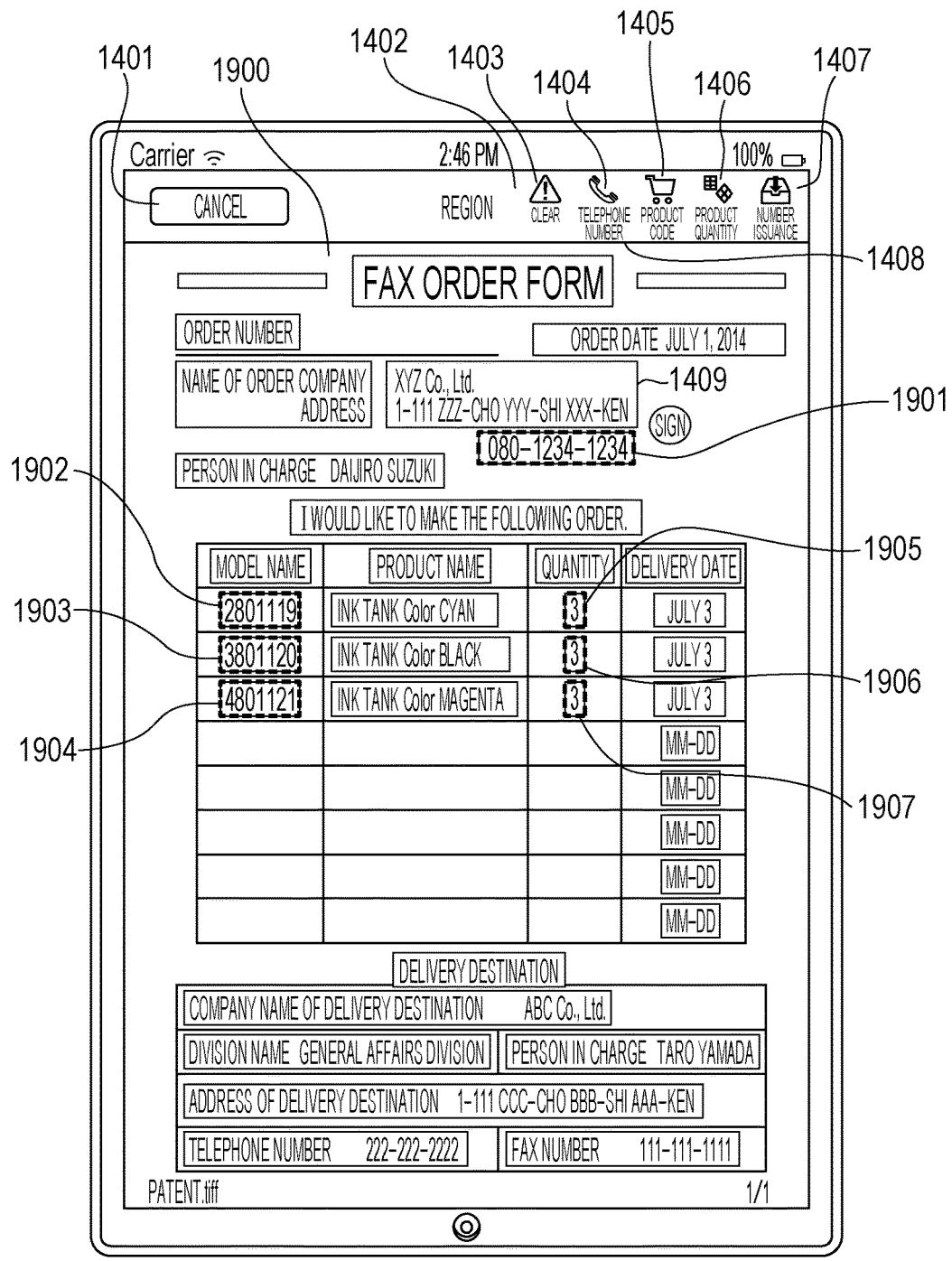
FIG. 19 is a diagram illustrating a UI of a mobile application.

The second OCR screen 1900 in a mobile terminal 104 will be described with reference to FIG. 19. In the OCR screen 1900, identification information of all selection regions is determined in accordance with history information and the identification information is visually displayed as examples. In a selection region 1901, identification information is determined as "tel". In a selection region 1902, identification information is determined as "code". In a selection region 1903, identification information is determined as "code". In a selection region 1904, identification information is determined as "code". In a selection region 1905, identification information is determined as "num". In a selection region 1906, identification information is determined as "num". In a selection region 1907, identification information is determined as "num". The selection regions in which the identification information thereof is determined are displayed in different colors for individual identification information so that the user may distinguish the identification information.

Search Region Narrowing Process

Figure 20:
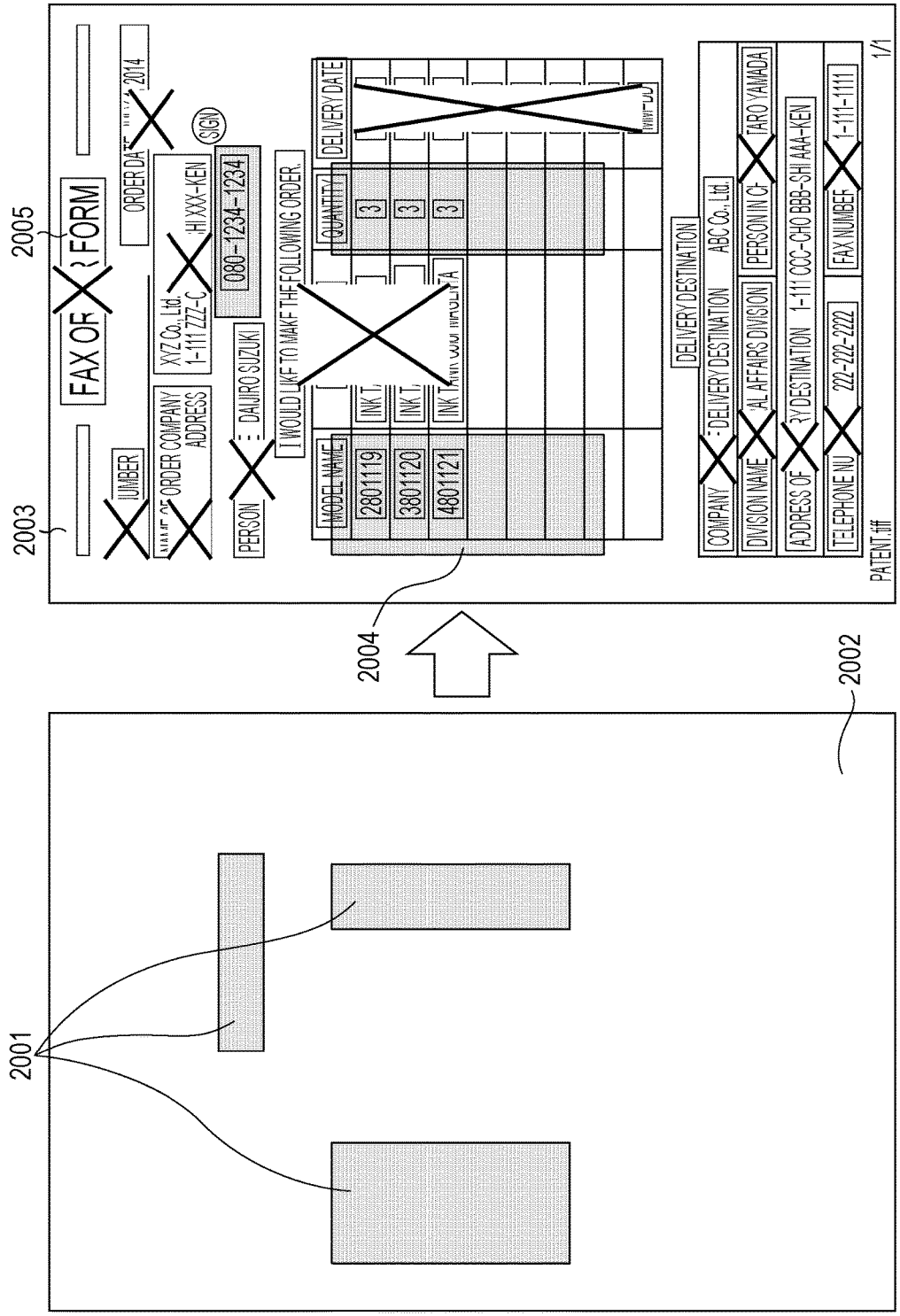
FIG. 20 is a diagram illustrating a search region narrowing process.

Next, a search region narrowing process performed by an operation history management unit 316 will be described with reference to FIG. 20. In a case where the second OCR screen 1900 illustrated in FIG. 19 is to be displayed, identification information of all selectable regions extracted from a FAX image are required to be determined. Therefore, search request regions 2001 and a search exception region 2002 are distinguished using coordinate information of history information in advance so that search request regions 2004 and a search exception region 2005 are determined among selectable regions in an input FAX image 2003. In this way, the number of search targets may be reduced since identification information of only the search request regions 2004 are determined, and accordingly, a display speed is improved. Identification of the search request regions 2001 and the search exception region 2002 is performed when a history is registered in an operation history database 1300 after transmission of a message. An existing search region and coordinate information of operation history information are compared with each other so that a region corresponding to an AND condition between the existing search region and the coordinate information is determined as a search region.

Flowchart of Extraction Information Transmission Process

Figure 21B:
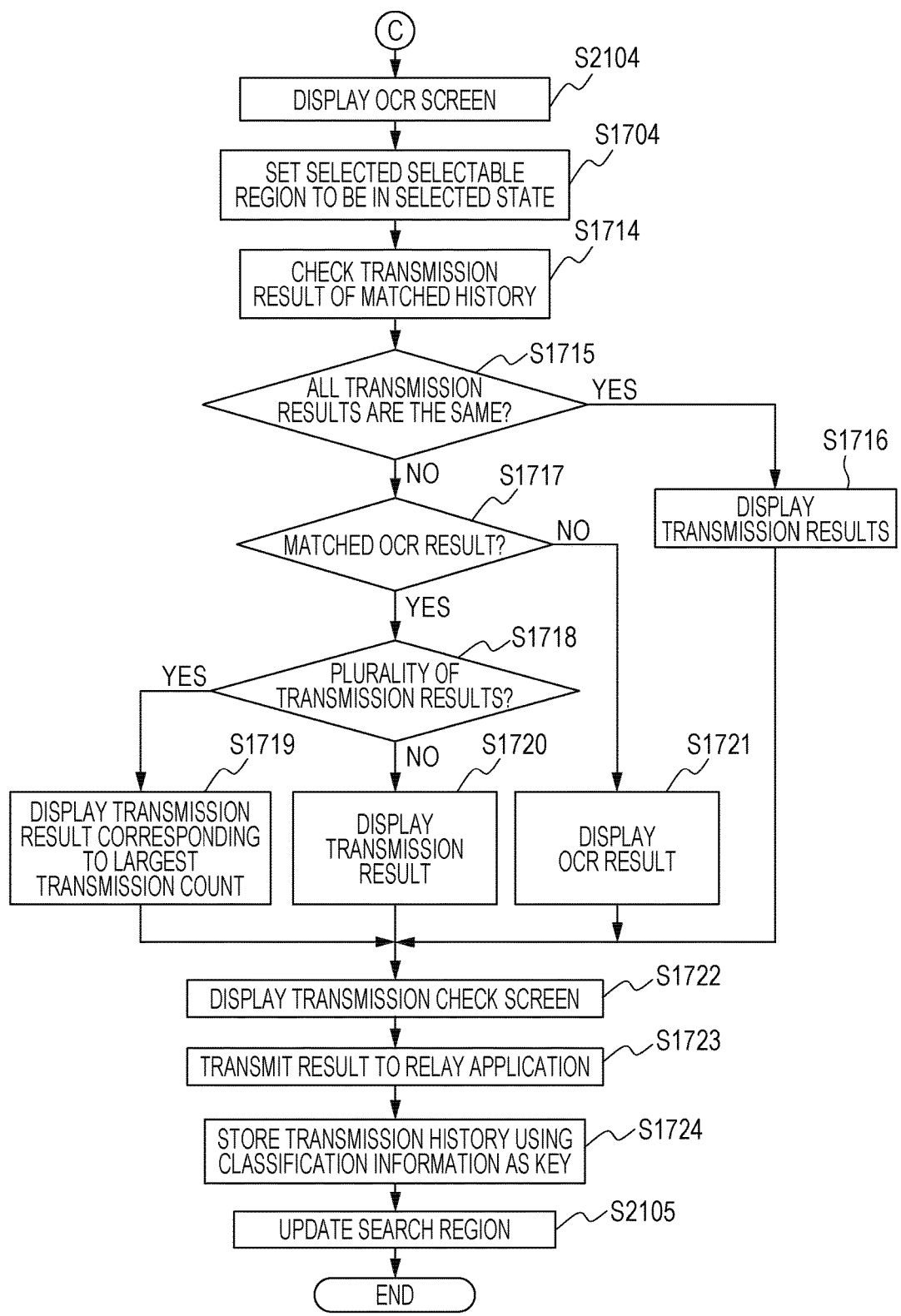

FIGS. 21A and 21B are a flowchart illustrating a second process of transmitting information extracted from an image by a button operation (step S505 of FIG. 5). This flow is started when a user presses an OCR button 402 while a FAX image is displayed in a mobile terminal screen 400 of the mobile terminal 104.

Note that step numbers the same as those assigned to the steps illustrated before are assigned to processes which are the same as the steps described before, and descriptions thereof are omitted unless otherwise noted.

In step S2101, an operation history management unit 316 performs the search region narrowing process described with reference to FIG. 20.

In step S2102, the operation history management unit 316 determines whether blocks generated in a FAX image are individually included in the search request regions 2004. In a case where a target block is included in one of the search request regions 2004 as a result of the determination, the process proceeds to step S1709. On the other hand, in a case where the block corresponds to the search exception region 2005, a next block is focused and the determination process is performed on the next block in step S2102.

In step S2103, the operation history management unit 316 determines identification information of the blocks. Furthermore, an information display unit 306 changes colors of regions of the blocks in the FAX image. Moreover, the information display unit 306 changes the colors for individual identification information. In addition, the regions are brought into a selectable state.

In step S2104, the information display unit 306 displays the OCR screen 1900.

In step S2105, the operation history management unit 316 determines whether a transmission history coordinate is included in a frame of an existing search region. When the determination is negative, the operation history management unit 316 updates search region information.

As described above, according to this embodiment, identification information of a selection region in the FAX image obtained by the mobile terminal 104 may be automatically determined in accordance with history information in the OCR screen 1900 and may be visually displayed.

Third Embodiment

In a third embodiment, a third extraction information transmission process will be described. Detailed descriptions of the configurations and the processing flows described in the foregoing embodiments are omitted. In the second embodiment, identification information of all selection regions is automatically determined in accordance with history information at a time of display of the OCR screen 1900 so that the identification information is visually recognized by a user. In the third embodiment, text information of a determined OCR result or a transmission result is displayed along with identification information automatically determined as a time of display of an OCR screen 2200.

OCR Screen (Mobile Terminal)

The third OCR screen 2200 in a mobile terminal 104 will be described with reference to FIG. 22. A dynamic generation display area 2201 is dynamically generated in accordance with text information in selection regions in which identification information is identified. In this embodiment, seven display areas are generated. A telephone number display area 2202 corresponds to the selection region 1901. A product code display area 2203 corresponds to the selection region 1902. A quantity display area 2204 corresponds to the selection region 1905. A product code display area 2205 corresponds to the selection region 1903. A quantity display area 2206 corresponds to the selection region 1906. A product code display area 2207 corresponds to the selection region 1904. A quantity display area 2208 corresponds to the selection region 1907.

A telephone number correction button 2209, a product code correction button 2210, a quantity correction button 2211, a product code correction button 2212, a quantity correction button 2213, a product code correction button 2214, or a quantity correction button 2215 are pressed when displayed text information is to be corrected. A send button 2216 is pressed to send. When one of the buttons is pressed, a transmission confirmation screen 1500 is displayed. A transmission execution button 1504 in the displayed transmission confirmation screen 1500 is brought to a non-display state, and a return button (not illustrated) is displayed instead. The user corrects the text information in this screen and presses the return button so that the OCR screen 2200 is displayed again. Furthermore, the display areas in the dynamic generation display area 2201 may be added or deleted by a user's operation.

Flowchart of Extraction Information Transmission Process

Figure 24B:
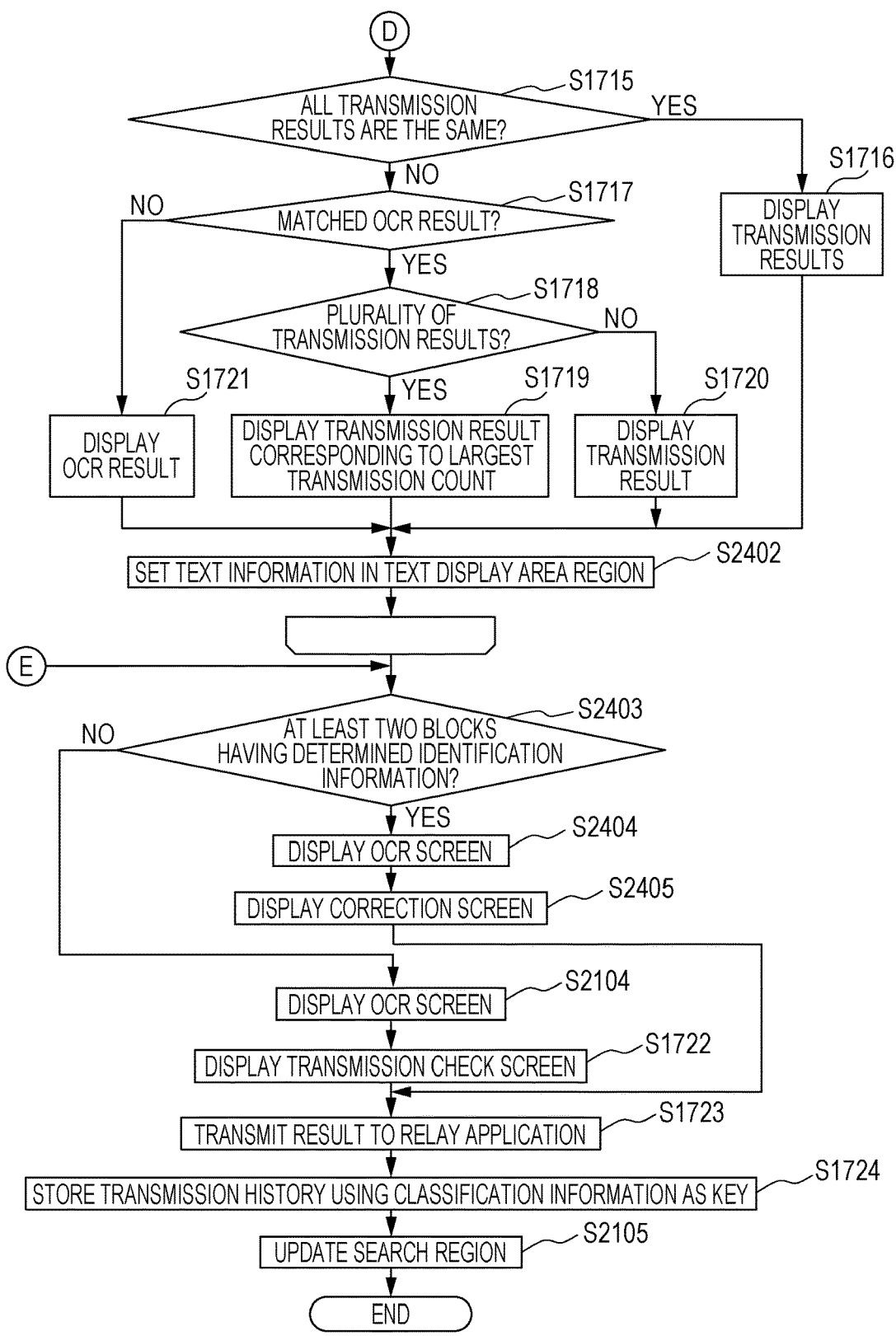
Figure 25A:
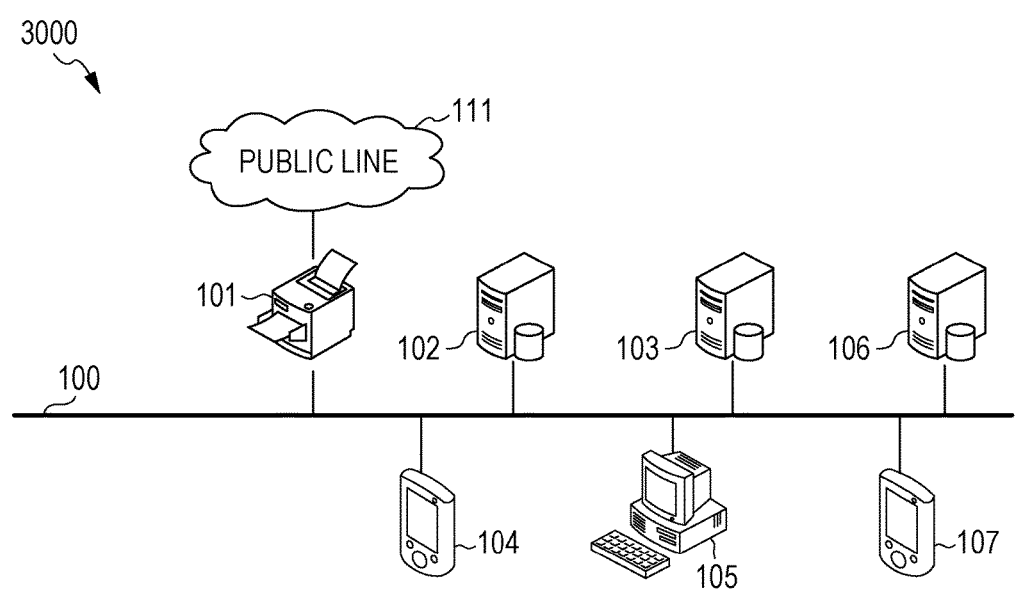
FIGS. 25A to 25E are diagrams illustrating an entire configuration of a system and software configurations of devices.
Figure 25B:
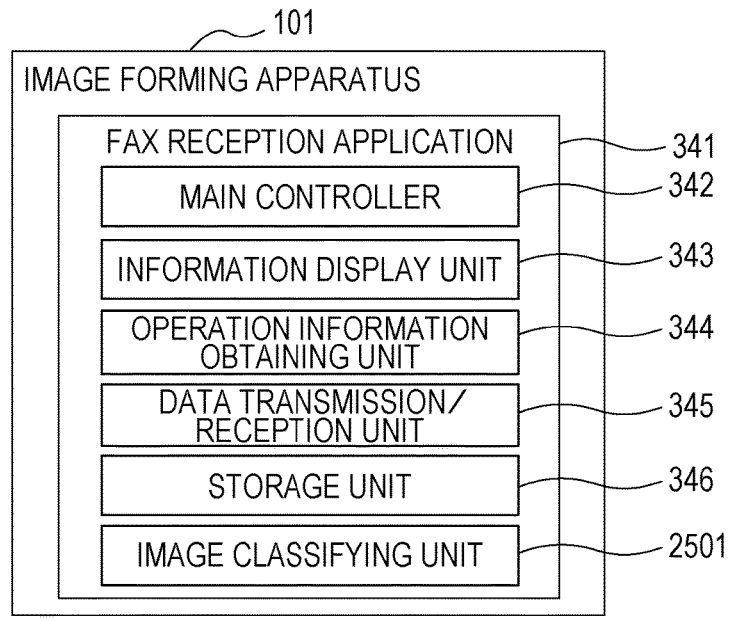
Figure 25C:
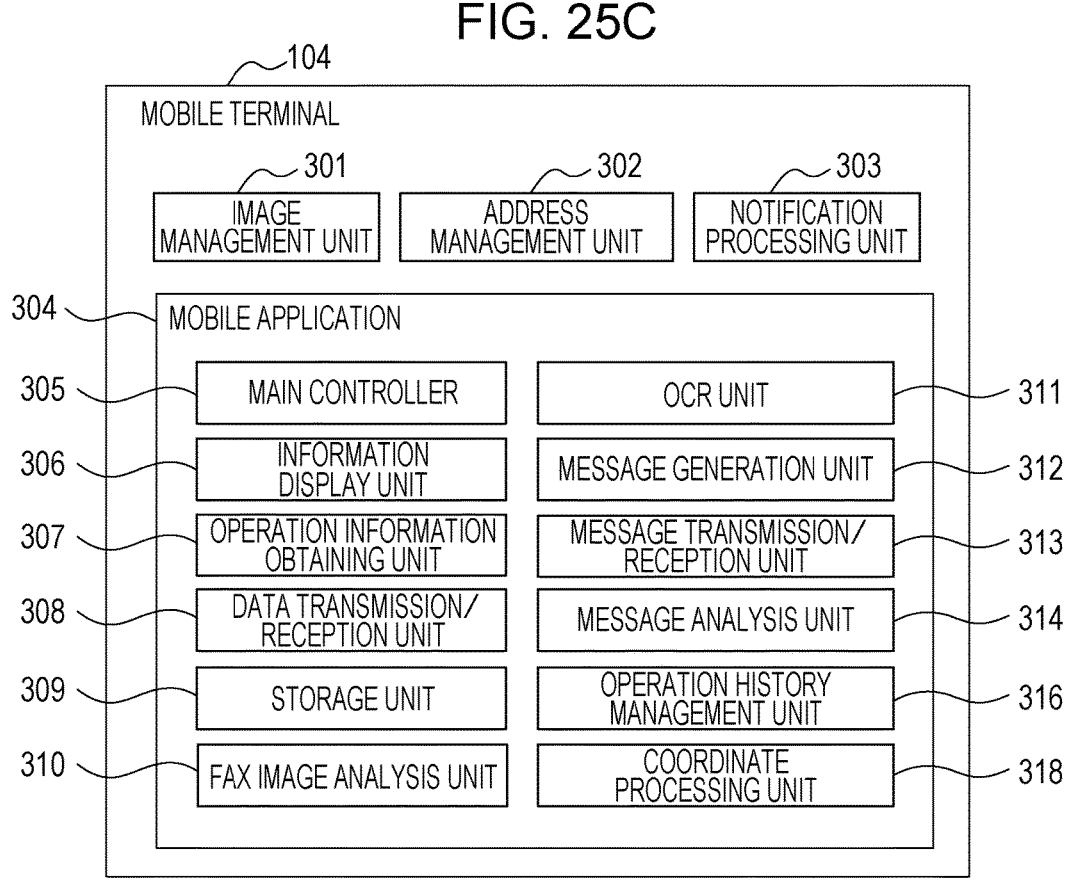
Figure 25D:
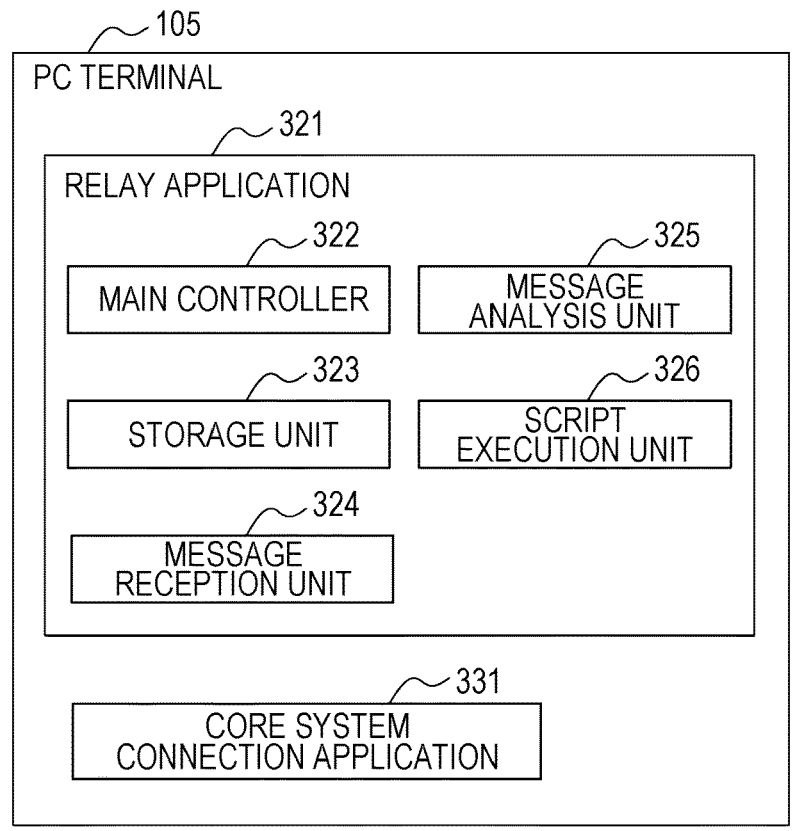
Figure 25E:
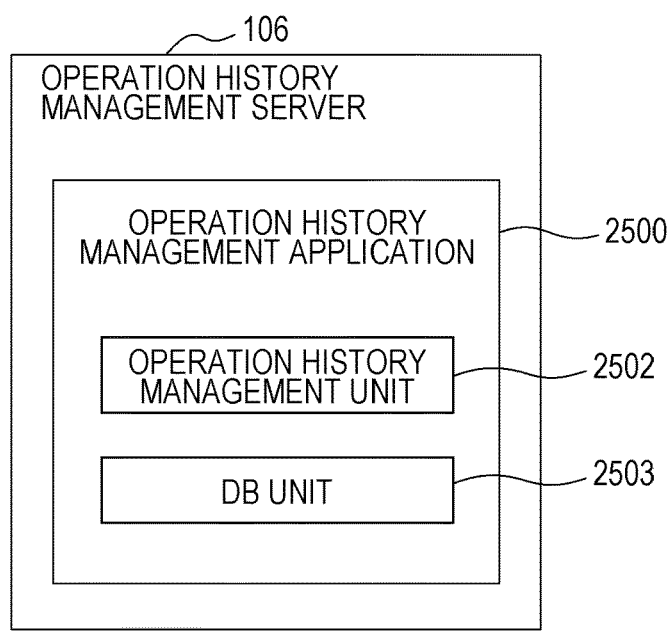

FIGS. 24A and 24B are a flowchart illustrating the process of transmitting information extracted from an image by a button operation performed as a third process in step S505 of FIG. 5 in detail. This flow is started when the user presses an OCR button 402 while a FAX image is displayed in a mobile terminal screen 400 of the mobile terminal 104.

Note that step numbers the same as those assigned to the steps illustrated before are assigned to processes which are the same as the steps described before, and descriptions thereof are omitted unless otherwise noted.

In step S2401, an information display unit 306 generates a display area region.

In step S2402, the information display unit 306 sets text information of a transmission result or an OCR result in the display area region.

In step S2403, in a case where at least two transmission histories in which identification information is determined in step S2103 exist, the process proceeds to step S2404, and otherwise, the process proceeds to step S2104.

Figure 22:
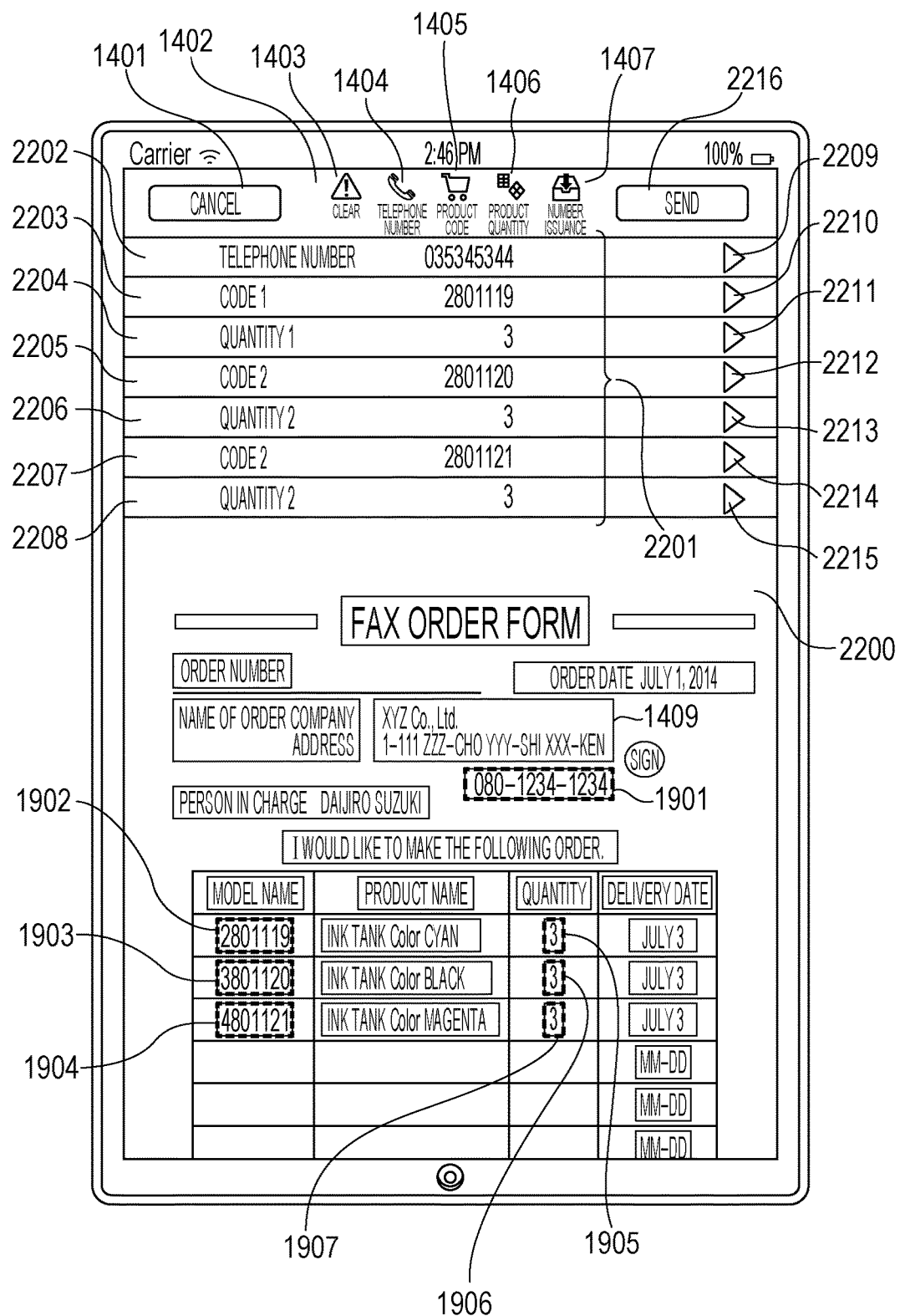
FIG. 22 is a diagram illustrating a UI of a mobile application.

In step S2404, the information display unit 306 displays the OCR screen 2200 of FIG. 22.

Figure 15:
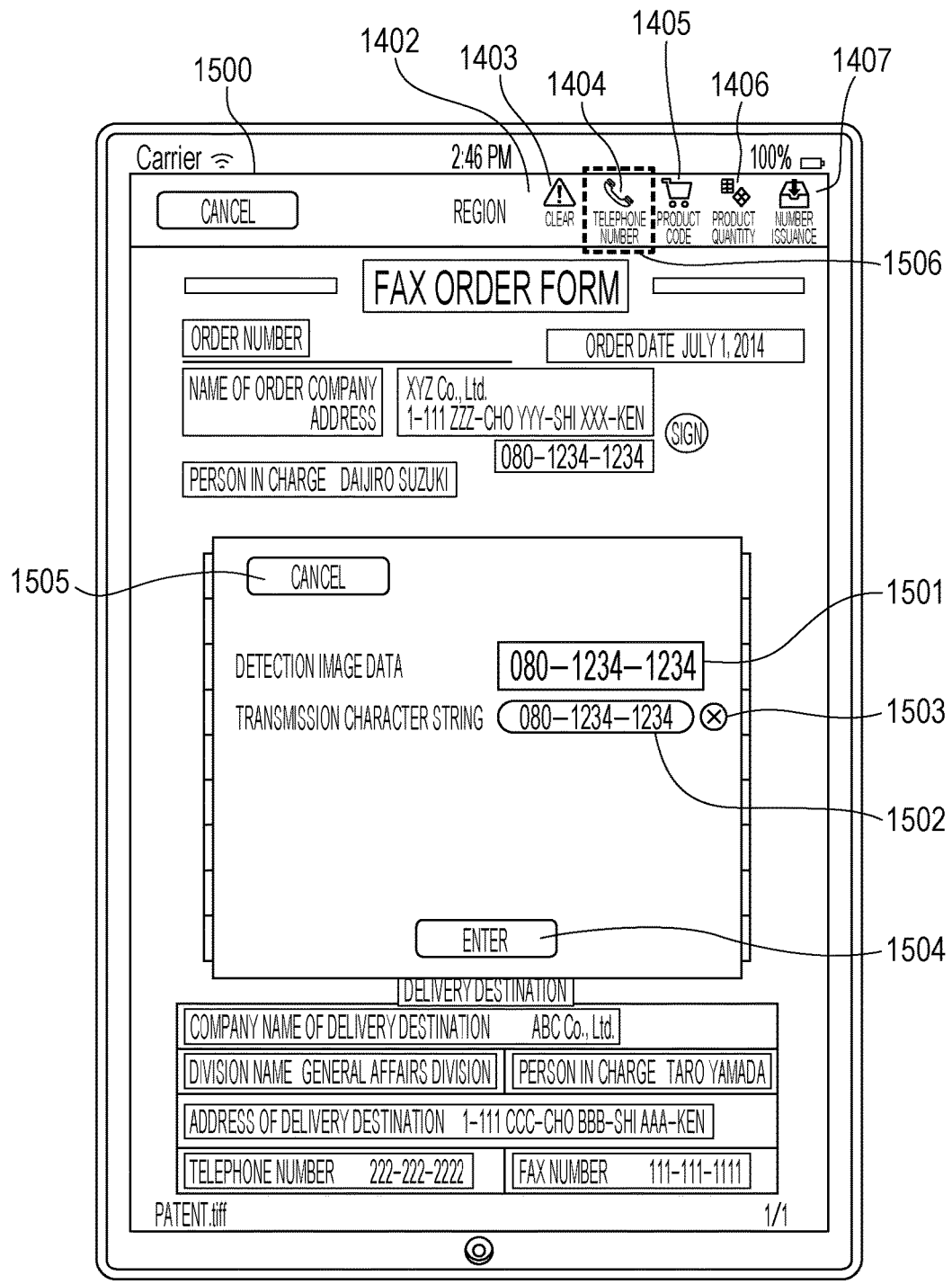
FIG. 15 is a diagram illustrating a UI of the mobile application.

In step S2405, when the user presses one of the correction button 2209 to 2215, the information display unit 306 displays a transmission confirmation screen 1500 of FIG. 15.

As described above, according to this embodiment, identification information of selection regions in the FAX image obtained by the mobile terminal 104 may be automatically determined in an OCR screen in accordance with history information, and types based on the identification information and text information may be displayed as a list.

Fourth Embodiment

In a fourth embodiment, a second system configuration will be described. Detailed descriptions of the configurations and the processing flows described in the foregoing embodiments are omitted. In this embodiment, a classifying process is performed by an image forming apparatus, and a result of the classifying process is used by a mobile terminal. Furthermore, history information is stored in a server and is usable by a plurality of mobile terminals.

System Configuration

A FAX order system 3000 will be described as an example of an information processing system according to this embodiment with reference to FIGS. 25A to 25E.

A mobile terminal 107 is configured similarly to a mobile terminal 104 and is connected to other devices in a communication available manner through a network 100.

An operation history management server 106 manages operation history information on operations performed using the PC terminals 104 and 107.

Software Configuration (Image Forming Apparatus)

Next, a software configuration of an image forming apparatus 101 will be described.

An image classifying unit 2501 performs, as with the image classifying unit 315, a classifying process using a feature value DB 1107 in which a learning process is performed in advance on a FAX image so as to classify the FAX image as described with reference to FIGS. 11A and 11B.

Software Configuration (Mobile Terminal)

A data transmission/reception unit 308 requests transmission of an inquiry issued by an operation history management unit 316 to an operation history management server 106 and performs information obtainment and information update.

Software Configuration (Operation History Management Server 106)

A history management application 2500 of an operation history management server 106 includes an operation history management unit 2502 and a DB unit 2503. The operation history management unit 2502 transmits data to and receives data from the data transmission/reception units 308 of the mobile terminals 104 and 107. The DB unit 2503 obtains and updates information using an operation history table in response to the inquiry supplied from the operation history management unit 2502.

Basic Flow

Next, a basic processing flow of a FAX order system 3000 will be described with reference to FIG. 23.

This flow is started when a FAX unit included in an image forming apparatus 101 receives a FAX image from another FAX apparatus.

In step S2601, the image classifying unit 2501 classifies a FAX image. Information on the classification is stores as FAX reception bibliographic information.

In step S2602, a main controller 305 recognizes the classification information included in the FAX reception bibliographic information. Furthermore, the operation history management unit 316 issues various inquiries to the operation history management server 106 through the data transmission/reception unit 308 so as to obtain operation history information.

In step S2603, the operation history management unit 316 transmits the operation history information to the operation history management server 106 through the data transmission/reception unit 308. The operation history management server 106 stores the received operation history information in a DB unit.

As described above, according to this embodiment, operation history may be stored in an external server and shared by a plurality of mobile terminals. The operation history may be stored in a PC terminal 105 or the image forming apparatus 101.

Other Embodiments

The present invention may be realized by supplying a program which realizes at least one of the functions in the foregoing embodiments to a system or an apparatus through a network or a storage medium and reading and executing the program by at least one processor included in a computer of the system or the apparatus. Furthermore, the present invention may be realized by a circuit which realizes at least one of the functions (ASIC, for example).

Although the preferred embodiments of the present invention have been described hereinabove, the present invention is not limited to the embodiments, and various modifications and changes may be made within the scope of the invention.

According to the system of the present invention, high-speed input to the system may be realized by comparing coordinates of regions in accordance with history of transmission results so that identification information is specified.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-046430, filed Mar. 9, 2015, which is hereby incorporated by reference herein in its entirety.

What is claimed is:

1. A first terminal configured to communicate with a second terminal, the first terminal comprising:
a transmission interface configured to transmit documents;
a storage configured to store, in accordance with results of a history of transmitting from the transmission interface documents having regions, historic coordinates of the regions included in transmitted documents and identification information of the regions of the transmitted documents;
a receiving interface configured to receive a document;

one or more processors; and memory storing instructions that, when executed by the one or more processors, cause the first terminal to perform operations including:
generating, in the received document, a plurality of regions having coordinates and text information obtained by character recognition,
comparing coordinates of a region selected from the plurality of generated regions with the historic coordinates of regions stored in the storage, and
determining, in a case where the coordinates of the selected region match one of the historic coordinates of regions stored in the storage, identification information of the selected region based on identification information of the matched one historic region coordinates,
wherein, in response to the transmission interface transmitting the determined identification information and text information to the second terminal, the second terminal automatically locates and executes a script specified by the transmitted determined identification information and causes the second terminal to enter the transmitted text information into an application of the second terminal, and
wherein the first terminal is a mobile terminal, the determined identification information is a value of an internal-name key, and the transmission interface and the receiving interface are one of an input/output interface and a network interface card.

2. The first terminal according to claim 1, wherein the transmission interface transmits the determined identification information and text information to the second terminal.

3. The first terminal according to claim 1, wherein, prior to comparing the selected region coordinates with the historic coordinates, the executed stored instructions further cause the first terminal to perform operations including:
classifying each stored historic coordinate into one of a plurality of groups according to a feature, and
classifying the received document according to a feature into one of the plurality of groups,
wherein comparing includes comparing the selected region coordinates with historic coordinates the group into which the received document is classified.

4. The first terminal according to claim 1, the executed stored instructions further cause the first terminal to perform operations including:
displaying the text information or a result of the character recognition, and
displaying a confirmation screen configured to receive corrections to a result of the character recognition.

5. The first terminal according to claim 4,
wherein the storage stores a result of character recognition, and
wherein displaying the text information includes displaying the text information in a case where the result of the character recognition matches the result of the character recognition stored in the storage.

6. The first terminal according to claim 1, in further response to the transmission interface transmitting the determined identification information and text information to the second terminal, the receiving interface receives a product order number from the second terminal that relates to the transmitted text information.

7. The first terminal according to claim 1, wherein the first terminal includes a first terminal application received from a remote location, wherein the first terminal application includes the instructions stored in the memory and a main controller configured to issue instructions that, in a case where executed, cause the storage to store the historic coordinates and identification information of the transmitted documents.

8. The first terminal according to claim 1, wherein the identification information of the selected region is one of a telephone number, a product code, and a product quantity.

9. The first terminal according to claim 1, wherein the received document is a facsimile document that includes text and images as a single fixed graphic image in a bitmap image file format.

10. The first terminal according to claim 1, the second terminal is a personal computer terminal.

11. A method for a first terminal configured to communicate with a second terminal, the method comprising:
transmitting documents from a transmission interface;
storing, in a storage and in accordance with results of a history of transmitting from the transmission interface documents having regions, historic coordinates of the regions included in transmitted documents and identification information of the regions of the transmitted documents;
receiving, via a receiving interface, a document;
generating, in the received document, a plurality of regions having coordinates and text information obtained by character recognition;
comparing coordinates of a region selected from the plurality of generated regions with the historic coordinates of regions stored in the storage; and
determining, in a case where the coordinates of the selected region match one of the historic coordinates of regions stored in the storage, identification information of the selected region based on identification information of the matched one historic region coordinates,
wherein, in response to the transmission interface transmitting the determined identification information and text information to the second terminal, the second terminal automatically locates and executes a script specified by the transmitted determined identification information and causes the second terminal to enter the transmitted text information into an application of the second terminal, and
wherein the determined identification information is a value of an internal-name key, and the transmission interface and the receiving interface are one of an input/output interface and a network interface card.

12. The method according to claim 11, wherein transmitting includes transmitting the determined identification information and text information to the second terminal.

13. The method according to claim 11, wherein, prior to comparing the selected region coordinates with the historic coordinates, the method further comprising:
classifying each stored historic coordinate into one of a plurality of groups according to a feature, and
classifying the received document according to a feature into one of the plurality of groups,
wherein comparing includes comparing the selected region coordinates with historic coordinates the group into which the received document is classified.

14. The method according to claim 11, further comprising:
displaying the text information or a result of the character recognition; and
displaying a confirmation screen configured to receive corrections to a result of the character recognition.

15. The method according to claim 14,
wherein storing includes storing a result of character recognition, and wherein displaying the text information includes displaying the text information in a case where the result of the character recognition matches the result of the character recognition stored in the storage.

16. A non-transitory computer-readable storage medium storing a program to cause a first terminal, configured to communicate with a second terminal, to perform a method, the method comprising:
transmitting documents from a transmission interface;
storing, in a storage and in accordance with results of a history of transmitting from the transmission interface documents having regions, historic coordinates of the regions included in transmitted documents and identification information of the regions of the transmitted documents;
receiving, via a receiving interface, a document;
generating, in the received document, a plurality of regions having coordinates and text information obtained by character recognition;
comparing coordinates of a region selected from the plurality of generated regions with the historic coordinates of regions stored in the storage; and
determining, in a case where the coordinates of the selected region match one of the historic coordinates of regions stored in the storage, identification information of the selected region based on identification information of the matched one historic region coordinates,
wherein, in response to the transmission interface transmitting the determined identification information and text information to the second terminal, the second terminal automatically locates and executes a script specified by the transmitted determined identification information and causes the second terminal to enter the transmitted text information into an application of the second terminal, and
wherein the determined identification information is a value of an internal-name key, and the transmission interface and the receiving interface are one of an input/output interface and a network interface card.

17. In an app store offering a digital distribution service to download applications, an application configured to be downloaded and installed into a first terminal configured to communicate with a second terminal and having a transmission interface configured to transmit documents, a receiving interface configured to receive a document, one or more processors, and a memory, the application comprising:
instructions that, when executed by the one or more processors, cause the first terminal to perform operations including:
storing, in a storage and in accordance with results of a history of transmitting from the transmission interface documents having regions, historic coordinates of the regions included in transmitted documents and identification information of the regions of the transmitted documents,
generating, in the received document, a plurality of regions having coordinates and text information obtained by character recognition,
comparing coordinates of a region selected from the plurality of generated regions with the historic coordinates of regions stored in the storage, and
determining, in a case where the coordinates of the selected region match one of the historic coordinates of regions stored in the storage, identification information of the selected region based on identification information of the matched one historic region coordinates,
wherein, in response to the transmission interface transmitting the determined identification information and text information to the second terminal, the second terminal automatically locates and executes a script specified by the transmitted determined identification information and causes the second terminal to enter the transmitted text information into an application of the second terminal, and
wherein the determined identification information is a value of an internal-name key, and the transmission interface and the receiving interface are one of an input/output interface and a network interface card.

18. The application according to claim 17, wherein the application is a mobile application, the first terminal is a mobile terminal, and the app store is one of iOS App Store app store and Google Play app store.

* * * * *